US012270747B2

(12) United States Patent
Placella et al.

(10) Patent No.: US 12,270,747 B2
(45) Date of Patent: Apr. 8, 2025

(54) DEVICE FOR COLLECTING MATERIAL FROM AIR

(71) Applicant: ROOT APPLIED SCIENCES INC., Oakland, CA (US)

(72) Inventors: Sarah Placella, Orinda, CA (US); Andrew Gillies, Oakland, CA (US)

(73) Assignee: ROOT APPLIED SCIENCES INC., Berkeley, CA (US)

( * ) Notice: Subject to any disclaimer, the term of this patent is extended or adjusted under 35 U.S.C. 154(b) by 354 days.

(21) Appl. No.: 17/661,341

(22) Filed: Apr. 29, 2022

(65) Prior Publication Data

US 2022/0349804 A1    Nov. 3, 2022

Related U.S. Application Data

(60) Provisional application No. 63/201,475, filed on Apr. 30, 2021.

(51) Int. Cl.
| | | |
|---|---|---|
| *G01N 15/06* | (2024.01) | |
| *B04C 5/04* | (2006.01) | |
| *B04C 5/185* | (2006.01) | |
| *B04C 9/00* | (2006.01) | |
| *G01N 15/01* | (2024.01) | |

(52) U.S. Cl.
CPC ........... *G01N 15/0618* (2013.01); *B04C 5/04* (2013.01); *B04C 5/185* (2013.01); *B04C 2009/002* (2013.01); *B04C 2009/007* (2013.01); *G01N 15/01* (2024.01)

(58) Field of Classification Search
CPC .. G01N 15/0618; G01N 15/01; G01N 1/2211; G01N 15/0606; G01N 15/075; B04C 5/04; B04C 5/185; B04C 2009/002; B04C 2009/007
See application file for complete search history.

(56) References Cited

U.S. PATENT DOCUMENTS

| | | |
|---|---|---|
| 4,475,379 A | 10/1984 | Jinotti |
| 4,941,899 A | 7/1990 | Liu |
| 5,090,257 A | 2/1992 | Bruce |
| 5,918,259 A | 6/1999 | Squirrell |
| 6,051,189 A | 4/2000 | Wick et al. |
| 6,207,369 B1 | 3/2001 | Wohlstadter et al. |

(Continued)

FOREIGN PATENT DOCUMENTS

| | | |
|---|---|---|
| CN | 103773677 A | 5/2014 |
| CN | 105606408 A | 5/2016 |

(Continued)

OTHER PUBLICATIONS

International Search Report and Written Opinion in PCT/US22/26929, mailed Sep. 14, 2022, 12 pages.

(Continued)

*Primary Examiner* — David Z Huang
(74) *Attorney, Agent, or Firm* — McKee, Voorhees & Sease, PLC

(57) ABSTRACT

A device collects material from air. The device swirls air within a fluid housing so as to deposit the material, such as viruses, bacteria, fungi and other particles, from the air in a way that the material can later be analyzed. The device can be used to provide for detection of airborne organisms or properties of material in the air.

10 Claims, 25 Drawing Sheets

(56) References Cited

U.S. PATENT DOCUMENTS

| | | |
|---|---|---|
| 6,485,686 B1 | 11/2002 | Wick |
| 6,491,872 B1 | 12/2002 | Wick |
| 6,584,865 B1 | 7/2003 | Doherty et al. |
| 6,777,228 B2 | 8/2004 | Lejeune |
| 6,985,818 B1 | 1/2006 | Samuels |
| 7,034,677 B2 | 4/2006 | Steinthal et al. |
| 7,171,312 B2 | 1/2007 | Steinthal et al. |
| 7,201,879 B2 | 4/2007 | Hill et al. |
| 7,243,560 B2 | 7/2007 | Coyle et al. |
| 7,299,709 B1 | 11/2007 | Grove et al. |
| 7,303,870 B2 | 12/2007 | Hunter et al. |
| 7,368,281 B2 | 5/2008 | Mozdy et al. |
| 7,410,063 B1 | 8/2008 | Chang et al. |
| 7,459,483 B2 | 12/2008 | Kober et al. |
| 7,536,898 B2 | 5/2009 | Owen |
| 7,547,662 B1 | 6/2009 | Quirk |
| 7,631,567 B1 | 12/2009 | Hill |
| 7,690,276 B1 | 4/2010 | Wise |
| 7,799,567 B1 | 9/2010 | Call |
| 7,850,908 B1 | 12/2010 | Wick |
| 7,892,794 B2 | 2/2011 | Jensen et al. |
| 7,932,024 B2 | 4/2011 | Jensen et al. |
| 7,960,170 B2 | 6/2011 | Schulz et al. |
| 7,985,540 B2 | 7/2011 | Jensen et al. |
| 7,997,300 B1 | 8/2011 | Wise et al. |
| 8,021,884 B1 | 9/2011 | Wick |
| 8,167,986 B2 | 5/2012 | Schneider et al. |
| 8,174,700 B2 | 5/2012 | Chinowsky et al. |
| 8,205,511 B1 | 6/2012 | Chen et al. |
| 8,309,029 B1 | 11/2012 | Wick |
| 8,337,775 B2 | 12/2012 | Pugia et al. |
| 8,449,824 B2 | 5/2013 | Sun |
| 8,476,016 B2 | 7/2013 | Ashby |
| 8,520,205 B2 | 8/2013 | Silcott |
| 8,541,191 B2 | 9/2013 | Dayton et al. |
| 8,647,858 B2 | 2/2014 | Broyer et al. |
| 8,691,522 B2 | 4/2014 | Kim et al. |
| 8,717,550 B2 | 5/2014 | Janka et al. |
| 8,726,744 B2 | 5/2014 | Alburty et al. |
| 9,012,236 B2 | 4/2015 | Jovanovich et al. |
| 9,024,002 B2 | 5/2015 | Cummings et al. |
| 9,028,758 B2 | 5/2015 | Keinan et al. |
| 9,029,082 B2 | 5/2015 | Friedberger et al. |
| 9,291,284 B2 | 3/2016 | Penterman et al. |
| 9,334,542 B2 | 5/2016 | Cummings et al. |
| 9,360,398 B2 | 6/2016 | Gold et al. |
| 9,494,579 B2 | 11/2016 | Schwoebel et al. |
| 9,500,568 B1 | 11/2016 | Wise |
| 9,645,135 B2 | 5/2017 | Shin et al. |
| 9,663,819 B2 | 5/2017 | Jovanovich et al. |
| 9,664,702 B2 | 5/2017 | Holmes et al. |
| 9,689,792 B1 | 6/2017 | Sickenberger et al. |
| 9,726,638 B2 | 8/2017 | Hwang et al. |
| 9,834,823 B2 | 12/2017 | Price et al. |
| 9,851,291 B2 | 12/2017 | Silcott |
| 9,927,391 B2 | 3/2018 | Tran |
| 9,933,351 B2 | 4/2018 | Kent et al. |
| 10,000,788 B2 | 6/2018 | Straus |
| 10,001,496 B2 | 6/2018 | Jung et al. |
| 10,018,537 B2 | 7/2018 | Verdier et al. |
| 10,119,114 B2 | 11/2018 | Kreuwel et al. |
| 10,161,927 B2 | 12/2018 | Yu et al. |
| 10,203,286 B2 | 2/2019 | Clinton et al. |
| 10,330,578 B2 | 6/2019 | Manautou et al. |
| 10,465,236 B2 | 11/2019 | Trau et al. |
| 10,557,176 B2 | 2/2020 | Yang et al. |
| 10,641,721 B2 | 5/2020 | Prasad et al. |
| 10,684,209 B1 | 6/2020 | Manautou |
| 10,775,279 B1 | 9/2020 | Kesavan et al. |
| 10,830,761 B2 | 11/2020 | Chou et al. |
| 10,908,062 B2 | 2/2021 | Manautou et al. |
| 10,934,596 B2 | 3/2021 | Gilbert et al. |
| 10,983,131 B1 | 4/2021 | Manautou et al. |
| 11,052,390 B1 | 7/2021 | Bernhards et al. |
| 11,112,339 B2 | 9/2021 | Kindt et al. |
| 11,119,049 B2 | 9/2021 | Keinan |
| 11,125,753 B2 | 9/2021 | Finkelstein et al. |
| 11,192,105 B2 | 12/2021 | Drews et al. |
| 2004/0038385 A1 | 2/2004 | Langlois et al. |
| 2004/0241876 A1 | 12/2004 | Fannes |
| 2006/0257853 A1 | 11/2006 | Herman |
| 2007/0107537 A1 | 5/2007 | Bell et al. |
| 2007/0292844 A1 | 12/2007 | Tilles et al. |
| 2011/0045517 A1 | 2/2011 | Derringer et al. |
| 2011/0159596 A1* | 6/2011 | Keinan ............... G01N 1/2211 422/86 |
| 2011/0251084 A1 | 10/2011 | Brenan et al. |
| 2011/0256630 A1 | 10/2011 | Clinton |
| 2012/0122075 A1 | 5/2012 | Call et al. |
| 2012/0196304 A1 | 8/2012 | Dees et al. |
| 2012/0288852 A1 | 11/2012 | Willson et al. |
| 2012/0309003 A1 | 12/2012 | Cummings et al. |
| 2013/0010200 A1 | 1/2013 | Kim et al. |
| 2013/0130243 A1 | 5/2013 | Livache et al. |
| 2013/0334042 A1 | 12/2013 | Grieve et al. |
| 2014/0273184 A1 | 9/2014 | Gordon |
| 2016/0016171 A1 | 1/2016 | Goel |
| 2016/0231324 A1 | 8/2016 | Zhao et al. |
| 2016/0363567 A1 | 12/2016 | Blackley |
| 2017/0027482 A1 | 2/2017 | Zilberstein et al. |
| 2017/0226571 A1 | 8/2017 | Finkelstein et al. |
| 2018/0099276 A1 | 4/2018 | Schmolke et al. |
| 2019/0259593 A1 | 8/2019 | Noziere |
| 2019/0346400 A1 | 11/2019 | Kim et al. |
| 2020/0325525 A1 | 10/2020 | Anderson et al. |
| 2020/0385801 A1 | 12/2020 | Rearick et al. |
| 2021/0010993 A1 | 1/2021 | Shibata et al. |
| 2021/0147917 A1 | 5/2021 | Kayyem et al. |
| 2021/0270722 A1 | 9/2021 | Chou et al. |
| 2021/0310070 A1 | 10/2021 | Dillon et al. |
| 2022/0011293 A1 | 1/2022 | Hummer et al. |

FOREIGN PATENT DOCUMENTS

| | | | |
|---|---|---|---|
| GB | 2224118 A | 4/1990 | |
| GB | 2387902 A | 10/2003 | |
| WO | WO-2012144886 A1 * | 10/2012 | ........... G01N 1/2211 |
| WO | WO-2013079927 A2 * | 6/2013 | ............ B01D 45/04 |
| WO | 2021250274 A1 | 12/2021 | |

OTHER PUBLICATIONS

Almasi, Mohammad Amin, "Development of a Colorimetric Loop-mediated Isothermal Amplification Assay for the Visual Detection of *Fusarium oxysporum* f.sp. melonis", Horticultural Plant Journal, vol. 5, No. 3, pp. 129-136, May 2019.

BioSampler® Bioaerosol Collection Device, Cat. No. 225 Series, SKC, www.skcinc.com, pp. 1-12, Apr. 2021.

"Cyclone Sampler for Field Operation: Using a wind directional reverse flow cyclone", Burkard Manufacturing Company Limited, 1 page, Apr. 2021.

Goto et al., "Colorimetric detection of loop-mediated isothermal amplification reaction by using hydroxy naphthol plue", Short Technical Reports, vol. 46, No. 3, pp. 167-172, 2009.

Biowatch Fact Sheet, Homeland Security, Office of Health Affairs, 1 page, Apr. 2003.

HP D300e Digital Dispenser Data Sheet, "Accelerate pharma and life sciences research", 4 pages, Jul. 2016.

Nicolaisen et al., "Fungal Communities Including Plant Pathogens in Near Surface Air Are Similar Across Northwestern Europe", Frontiers in Microbiology, vol. 8, Article 1729, pp. 1-11, Sep. 2017.

Spornado Fact Sheet, "Spornado Disease Alert System", www.spornadosampler.com, 2 pages, Apr. 2021.

Thiessen et al., "Development of a quantitative loop-mediated isothermal amplification assay for the field detection of Erysiphe necator", PeerJ, vol. 6, e4639, DOI 10.7717/peerj.4639, pp. 1-17, 2018.

West et al., "Innovations in air sampling to detect plant pathogens", Annals of Applied Biology, vol. 166, pp. 4-17, 2015.

(56) References Cited

OTHER PUBLICATIONS

Bottiger, Jerold R., "Aerosol Modulating Nozzle", United States Statutory Invention Registration, Reg. No. H1027, Assignee: The United States of America as represented by the Secretary of the Army, published Mar. 3, 1992.

* cited by examiner

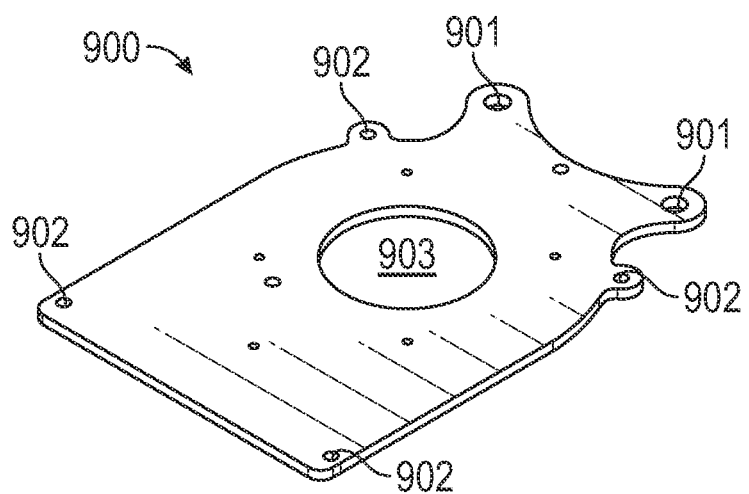
FIG. 9A
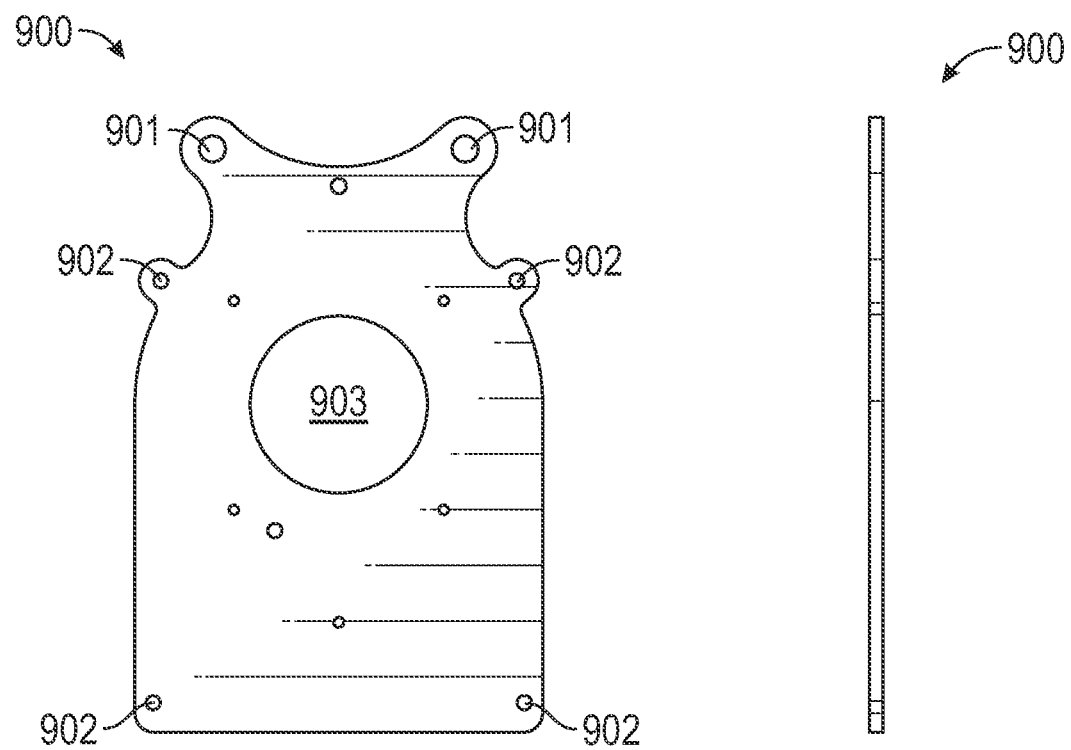
FIG. 9B
FIG. 9C

DEVICE FOR COLLECTING MATERIAL FROM AIR

CROSS REFERENCE TO RELATED APPLICATIONS

This application claims priority under 35 U.S.C. § 119 to provisional patent application U.S. Ser. No. 63/201,475, filed Apr. 30, 2021. The provisional patent application is herein incorporated by reference in its entirety, including without limitation, the specification, claims, and abstract, as well as any figures, tables, appendices, or drawings thereof.

FIELD OF THE INVENTION

The present invention relates generally to an apparatus and/or corresponding method of use in the ecology, plant pathology, entomology, microbiology, soils, air quality, healthcare, pharmaceutical, manufacturing, or engineering industries. More particularly, but not exclusively, the present invention relates to an air capture and genetic analysis device for sampling air.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Airborne pathogens present problems to the health of humans, animals, and plants. Airborne organisms can also present problems during manufacturing processes, such as during the manufacturing of pharmaceuticals.

Currently, there is no way for farmers to know when airborne pathogens are present in a timely manner. Though there are a number of technologies that are used to collect material from the air, most require sending collected material to a laboratory for analysis. The labor involved is costly, and the time between airborne pathogen presence and information on airborne pathogen presence is too long for a farmer to be able to respond in a timely manner. Thus, some farmers are forced to regularly spray pesticides, including fungicides and bactericides, prophylactically to prevent potential pathogen outbreaks instead of spraying only when the pathogen is present. Other farmers are forced to rely on visual inspection of the crops to manage pathogens.

One example of such a non-effective tool consists of a widely circulated powdery mildew risk index for detecting grapevine powdery mildew using temperature, barometric pressure, humidity, and other weather conditions. This widely circulated model does not provide an accurate pathogen projection. Any spraying decisions made based on the model do not lead to better pathogen management.

Other existing tools automatically determine pathogen risk based on environmental conditions, primarily temperature and humidity. Even other tools are however not effective and typically rely on imaging analysis or lasers and neural network analysis. These automated technologies cannot process a large enough volume of air for a good assessment because too much material collected inhibits the ability of the technology to work at all. The sample flow has to be small because the imaging has to be able to see tiny particles by themselves. The fungal spores from many species are indistinguishable from each other using imaging-based technologies or measuring physical characteristics. Spores of related organisms can be visually identical (on the surface) until after the pathogen develops.

Some known spore trapping services can provide spore count for certain pathogens, such as spinning rod spore traps and other related technologies. However, these technologies fail to collect samples directly or cleanly from the air, have inadequate sensitivity, and cannot analyze genetic properties of collected samples without prior transfer of a portion of the sample. These problems prevent known sample collection/ sample analyses from being able to accurately represent the actual pathogen risk in the air.

Moreover, reliable pathogen risk assessments require information, such as DNA-based information, on quantity of the pathogen present. Fluorescence has been used in an attempt to address this problem; however the use of fluorescence has been in vain because the fluorescent tags are not stable over time and cannot be lyophilized. See e.g., Thiessen et al., "Development of a Quantitative Loop-mediated Isothermal Amplification Assay for the Field Detection of Erysiphe Necator," PeerJ, 2018.

Most farmers need advanced warning to be able to treat harmful spores successfully and/or harvest early. Thus, in view of the foregoing issues affecting the state of the art, there exists a strong need for an apparatus which provides farmers with a prompt warning. There also exists a need in the art to collect particles from a large volume of air near-continuously in a way that the device is more sensitive and more accurate. There even further exists a need in the art to analyze the genetic properties of collected material in a quantifiable and accurate manner.

SUMMARY OF THE INVENTION

The following objects, features, advantages, aspects, and/ or embodiments, are not exhaustive, and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to warn farmers about the presence of fungal pathogens that can devastate crops in their fields. In a non-limiting example, use of the present invention can detect harmful spores in the air seven to ten days before disease symptoms appear.

It is still yet a further object, feature, and/or advantage of the present invention to spray fungicides at just the right time or to eliminate the need to overspray fungicides or. Farmers should thus be enabled to spray only when there is a real threat, a greater effectiveness of fungicides achieved, and pathogen levels reduced at an early stage. The reduction in unnecessary fungicide spraying can result in enormous cost-savings, increased yield, and numerous benefits to consumers and the environment.

It is still yet a further object, feature, and/or advantage of the present invention to allow for the device to filter a large quantity of air. This can be accomplished using a large fluid inlet or a fan to push air through the device at a higher flow rate. For example, it is preferable to filter at least one hundred liters of air per minute (100 L/min), more preferable to filter at least two hundred liters of air per minute (200 L/min), even more preferable to filter at least three hundred liters of air per minute (300 L/min), and most preferable to filter at least three hundred seventy five liters of air per minute (375 L/min), such as in embodiments that allow for a filtering rate as high as five hundred liters of air per minute (500 L/min). It can be beneficial to filter the large quantity of air so that material can be collected from the air without grease, contaminating substances, and/or substances that inhibit downstream application.

It is still yet a further object, feature, and/or advantage of the present invention to utilize fully automated, in-field sensors so as to send pathogen alerts directly to mobile phones and other personal electronic devices and/or upload alerts automatically to a dashboard displayed on a screen accessible/monitored by the farmer. The sensor can consist of a base unit and a cartridge. In a non-limiting example, all reagents are located in the replaceable cartridge, and the cartridge contains greater than twenty tests for frequent sampling during months-long growing seasons. The cartridge can be used either (i) for multiple different reactions at a single time or (ii) at a rate of two tests per week over a period of the sampling. In other non-limiting examples, the cartridge can contain only half a dozen or a dozen tests.

It is still yet a further object, feature, and/or advantage of the present invention to house all major electronic components of the build/device in a convenient and accessible location, such as within a single housing.

It is still yet a further object, feature, and/or advantage of the present invention to test and analyze different nucleic-acid-based or epitope-based assay systems for robustness, accuracy, efficiency, and cost. For example, the percentage of spores that are lysed can vary depending upon the assay, and so it is preferred that the testing of assays is still possible even when dirt blows into the collection device, when reagents are exposed to temperatures that are below freezing, and/or when reagents exceed temperatures of one-hundred degrees Fahrenheit and, even more preferably, when reagents exceed temperatures of one-hundred twenty degrees Fahrenheit.

It is still yet a further object, feature, and/or advantage of the present invention to collect data that will become a resource for ecology-based AI modeling of crop disease risk. The collected data can be uploaded to on-demand cloud computing platforms and application programming interfaces ("APIs"), such as Amazon Web Services ("AWS"), so that pathogen data can be combined with weather data, pathogen pressure(s) in adjacent field(s), data from other like-units, and other ecological measurements using AI methods to provide crop management services.

The air capture and genetic analysis device disclosed herein can be used in a wide variety of applications. For example, applications can include detection of pathogens (including at least viruses, bacteria, and fungi), airborne organisms, soil organisms, particles, or pollen (i) in agricultural fields to inform management or health, (ii) in greenhouse or vertical farming operations, (iii) in agricultural storage facilities, (iv) in traditional storage facilitates for a range of products including imports, exports, consumer products, grocery, pharmaceuticals, (v) in manufacturing facilities, clean rooms, and plastic manufacturing facilities, (vi) in hospitals, hospital waiting rooms, operating rooms, (vii) in shipping containers, (viii) during transportation, (ix) in homes, apartments, office buildings, other residential or commercial properties, cafes, and restaurants, and (x) in open-air environments, such as dense environments for workers packing fruits and/or vegetables (e.g., under an awning). In a more specific example, the device can be used to detect spinach downy mildew before same devastates crops in the field. In yet another specific example, the device can also be used to detect grapevine powdery mildew in vineyards because said powdery mildew poses a serious threat to growers. In a third example, the device can be used in a greenhouse system to sequence airborne material to advise on pesticide applications (timing and type), filtration, and harvest. In a fourth example, the device can be used for detection of molds and mold levels in pharmaceutical manufacturing facilities.

It is preferred the device and its components be safe and durable. For example, the apparatus can be adapted to resist mechanical and/or thermal degradation due to contact with mechanical debris or repeated exposure to sunlight, wind, and extreme changes in temperature, especially where the device is employed in harsh climates. The device should also be sized such that the device cannot be inadvertently moved but also should not obstruct farm workers or interfere with farm machinery in the field. In some embodiments, the device can attach to a trellis or other support system so that the device is out of the way of workers and machinery. In yet other embodiments, the device can be mounted to a vehicle, such as a tractor, truck, or drone.

Beneficially, the device can, in some embodiments, heat material collected so that the reagents for microfluidic applications do not freeze.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of an air capture and genetic analysis device which accomplishes some or all of the previously stated objectives.

The air capture and genetic analysis device can be incorporated into systems or kits which accomplish some or all of the previously stated objectives.

According to some aspects of the present disclosure, an air capture and genetic analysis device comprises a housing with a fluid inlet, said housing configured to exert a centripetal force on air entering the fluid inlet; a fan that when operated causes air to enter the fluid inlet; a power source for powering the fan; a collection zone for capturing particles contained within the air that enters the fluid inlet, wherein a fluid entrance of said collection zone is oriented perpendicularly to a direction the air enters the fluid inlet and positioned below the air inlet; and an outlet allowing for air to exit the capture device after the particles have been captured in the collection zone.

According to some additional aspects of the present disclosure, the air capture and genetic analysis device comprises a weathervane.

According to some additional aspects of the present disclosure, the centripetal force can be generated by shaping the housing into a scroll shape and/or use of a dry cyclone that can classify, separate, or sort particles in a fluid suspension based on a ratio of centripetal force to fluid resistance, inertial force, and gravitational force.

According to some additional aspects of the present disclosure, renewable energy systems can be employed. For example, the power source can be a rechargeable lead acid battery electrically connected to an array of solar panels or a rechargeable lithium-ion battery electrically connected to a wind turbine.

According to some other aspects of the present disclosure, a method of collecting material from a gaseous fluid comprises rotating the fluid within a fluid housing to deposit cells, soil, pollen, and/or debris within the fluid onto a surface of the fluid housing; mixing the fluid with water and/or a reagent; heating the fluid to lyse cells and/or retrieve genetic material be it from cells, viruses, pollen, soil, or infectious agents; and separating a supernatant from the lysed materials and debris. The supernatant can contain deoxyribonucleic acid(s) ("DNA"), ribonucleic acid ("RNA"), or other identifying compounds.

According to some additional aspects of the present disclosure, the method further comprises collecting inhibitors in the reagent, transferring the supernatant to a separate region for analysis; and/or analyzing data associated with the supernatant. The data can be automatically uploaded to a cloud-based network as it is collected, manipulation and analyses of said data can then automatically occur in the cloud, and then the data can then be disseminated automatically to the appropriate parties. For example, a farmer could be automatically alerted if the analyzed data indicates there are a meaningful quantity of harmful pathogens, viruses, or bacteria that could negatively affect yield of a crop planted within a field where the material is collected.

The transferring can occur by allowing gravity to move the supernatant through a hole on the side of the fluid housing into a printer, microfluidic, or millifluidic system. Analyzing the data can be accomplished in part through observing a presence or absence of specific nucleic acids or proteins that is indicative of the presence of a specific species, using different quantities of DNA-containing supernatant, and/or using different quantities of material collected. These help to assess the risk of pathogens harming crops in a quantifiable manner. Also quantifiable and of particular interest in certain applications could be a number of beneficial organisms found in the collected material.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 9A shows a top perspective, component view of a collection plate that is shown to be implemented within the TAZ embodiment of FIG. 5A.

FIG. 9B shows a top elevational, component view of the collection plate of FIG. 8A.

FIG. 9C shows a side elevational, component view of the collection plate of FIG. 8A.

Figure 1A:
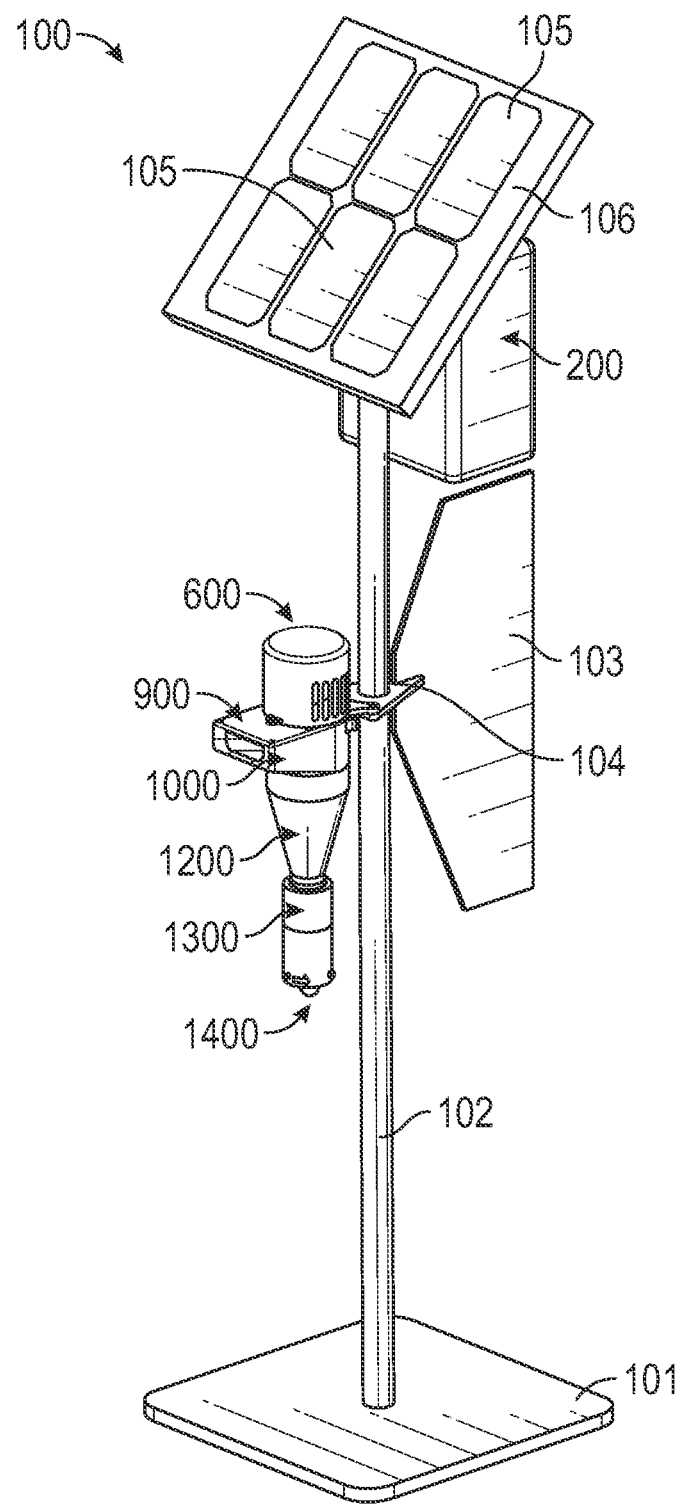
FIG. 1A shows a front perspective view of an exemplary air capture and genetic analysis device embodied within a first build, according to some aspects of the present disclosure.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Referring now to the figures, an exemplary air capture and genetic analysis device and build 100 includes a base 101, a rod 102 extending upward from the base 101, a wind vane 103, a mounting plate 104 for attaching the wind vane 103 to the rod 102, a means for harnessing renewable energy, and supports for same.

Figure 1B:
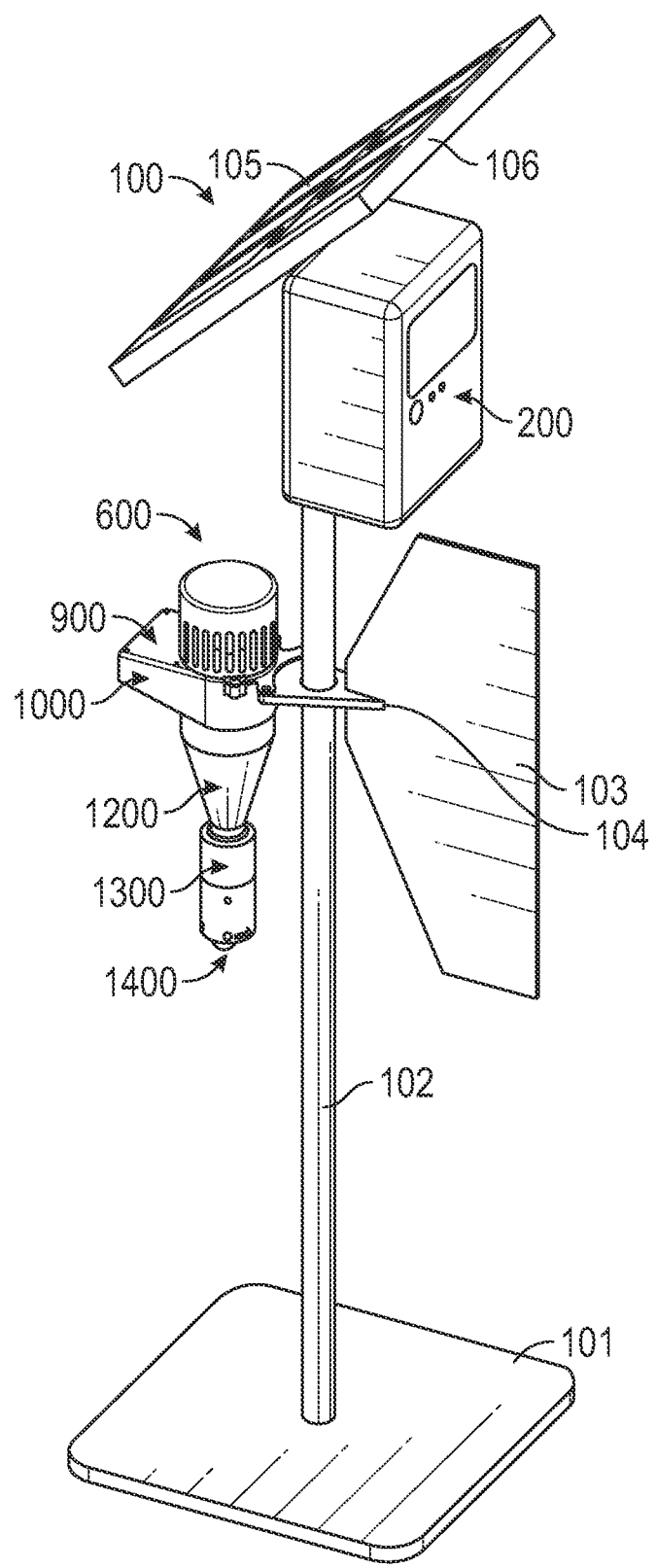
FIG. 1B shows a rear perspective view of the first build of FIG. 1A.
Figure 4A:
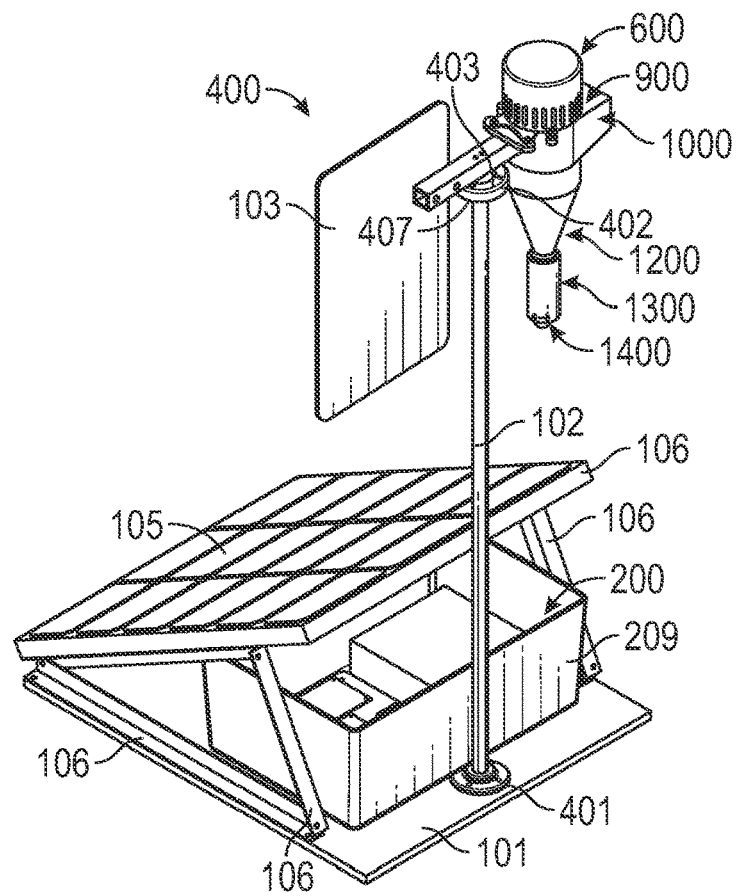
FIG. 4A shows a rear perspective view of an exemplary air capture and genetic analysis device, hereinafter referred to as the "TAZ" or "TAZ embodiment". The TAZ is shown embodied within a second build, according to some aspects of the present disclosure.
Figure 4B:
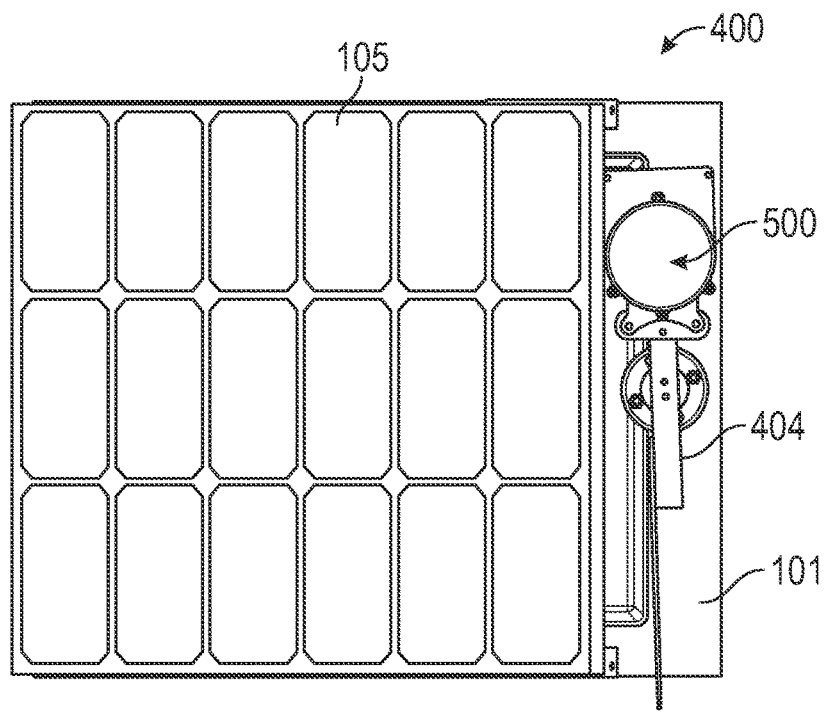
FIG. 4B shows a top elevational view of the second build of FIG. 4A.
Figure 4C:
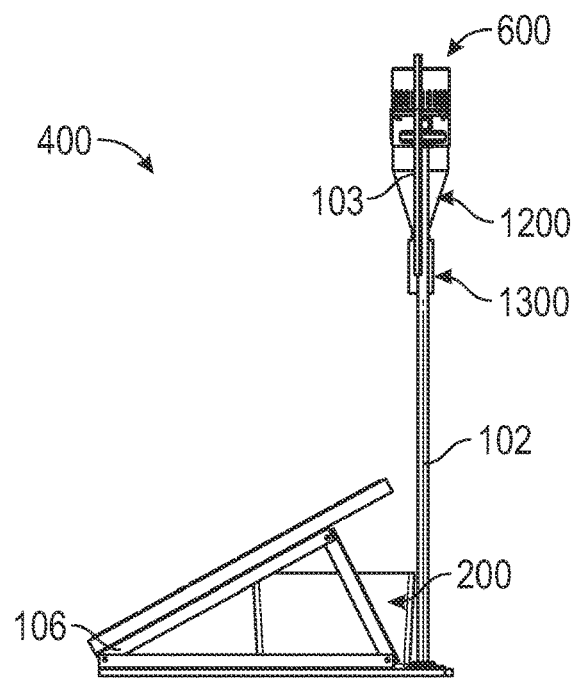
FIG. 4C shows a side elevational view of the second build of FIG. 4A.
Figure 4D:
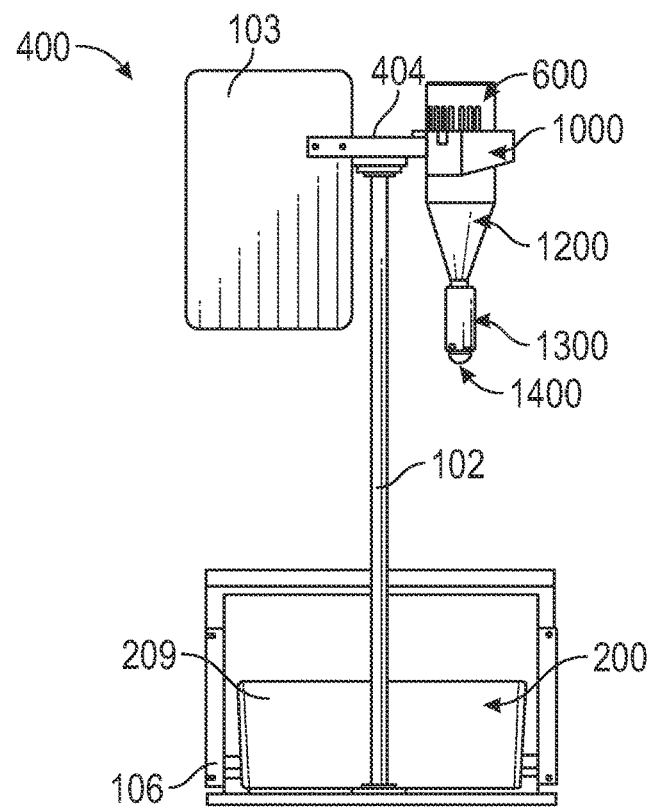
FIG. 4D shows a rear elevational view of the second build of FIG. 4A.
Figure 5A:
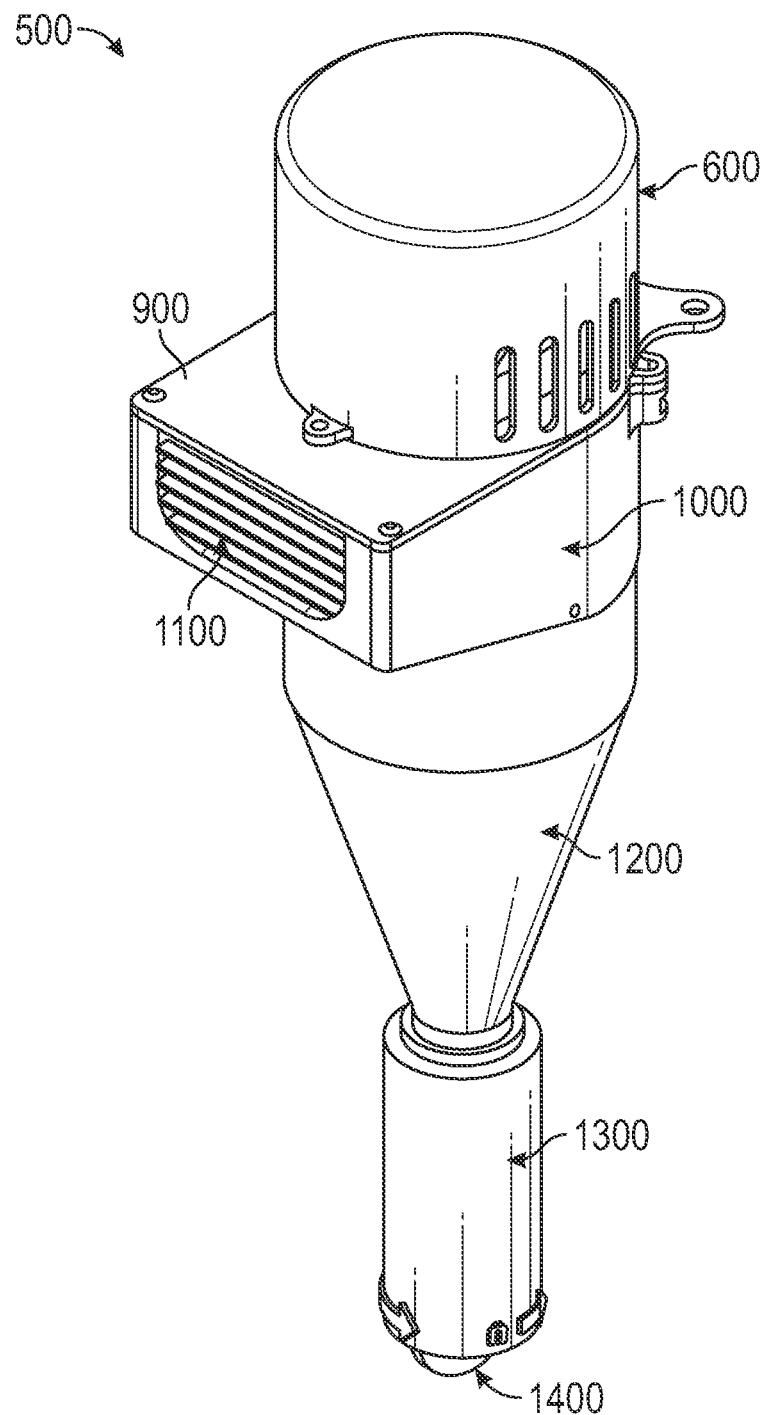
FIG. 5A shows a side perspective view of an exemplary air capture and genetic analysis device, the TAZ embodiment, implemented within the build of FIG. 4A.
Figure 5B:
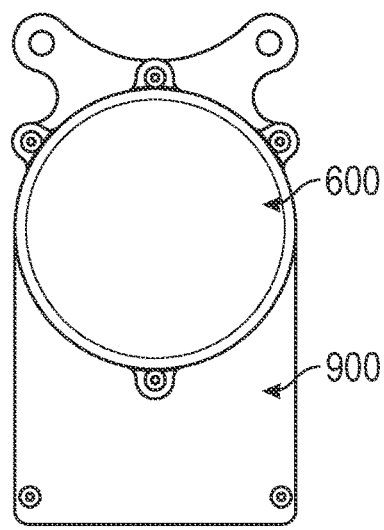
FIG. 5B shows a top elevational view of the TAZ embodiment of FIG. 5A.
Figure 5C:
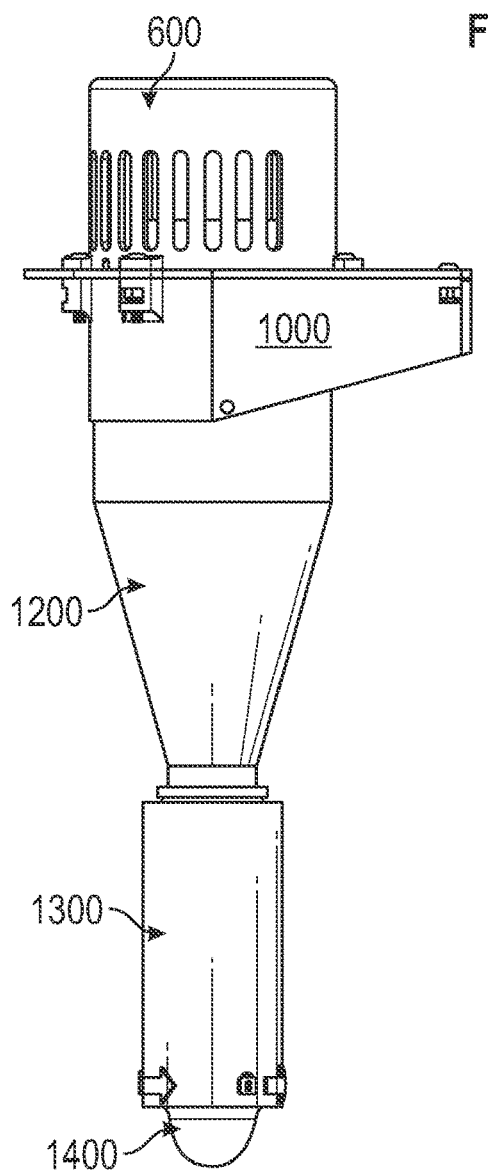
FIG. 5C shows a front elevational view of the TAZ embodiment of FIG. 5A.
Figure 5D:
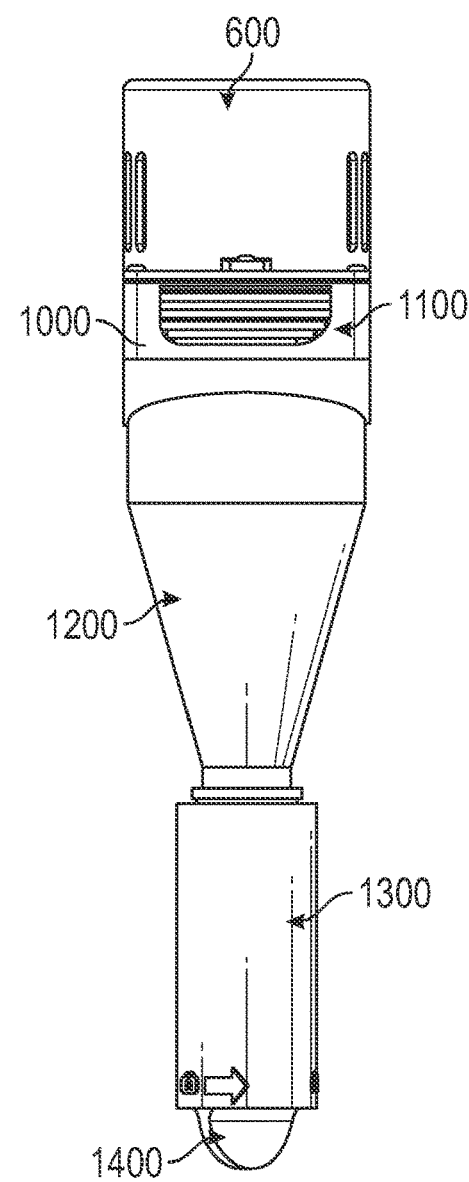
FIG. 5D shows a left-side elevational view of the TAZ embodiment of FIG. 5A.
Figure 5E:
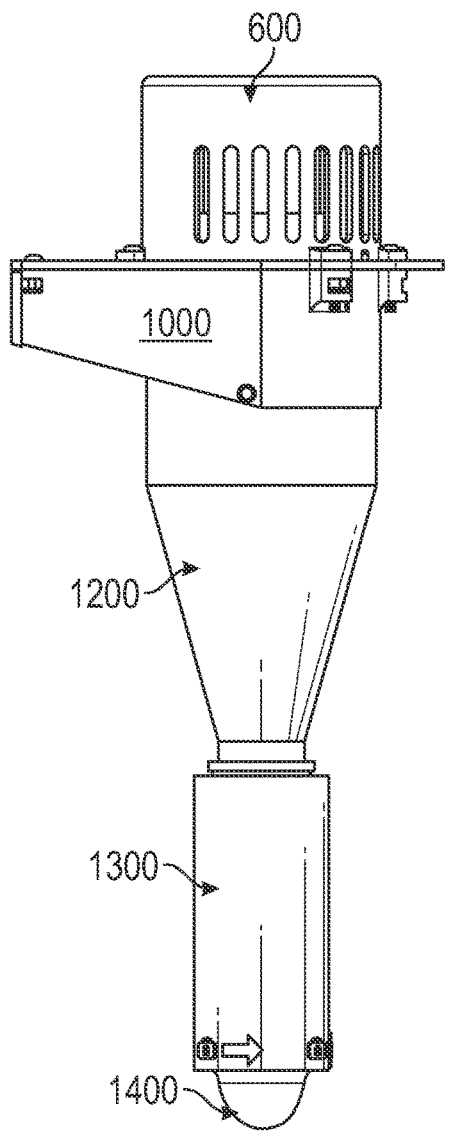
FIG. 5E shows a rear elevational view of the TAZ embodiment of FIG. 5A.
Figure 5F:
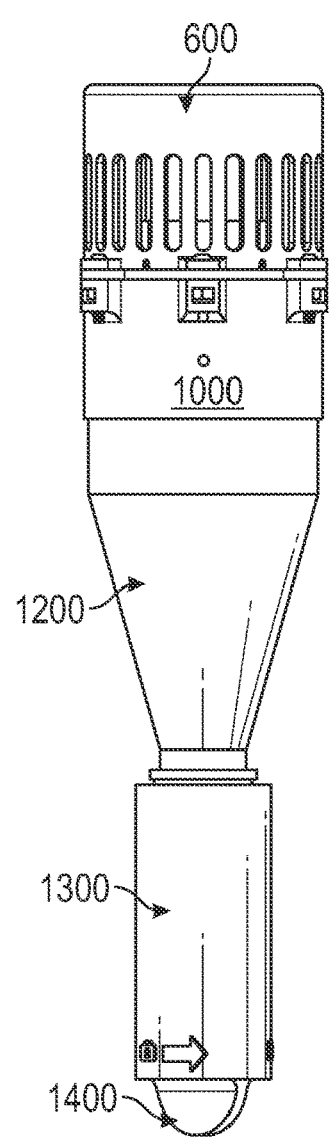
FIG. 5F shows a right-side elevational view of the TAZ embodiment of FIG. 5A.
Figure 5G:
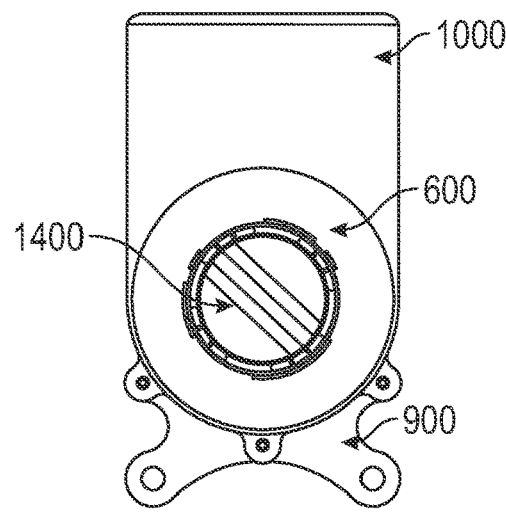
FIG. 5G shows a bottom elevational view of the TAZ embodiment of FIG. 5A.
Figure 6A:
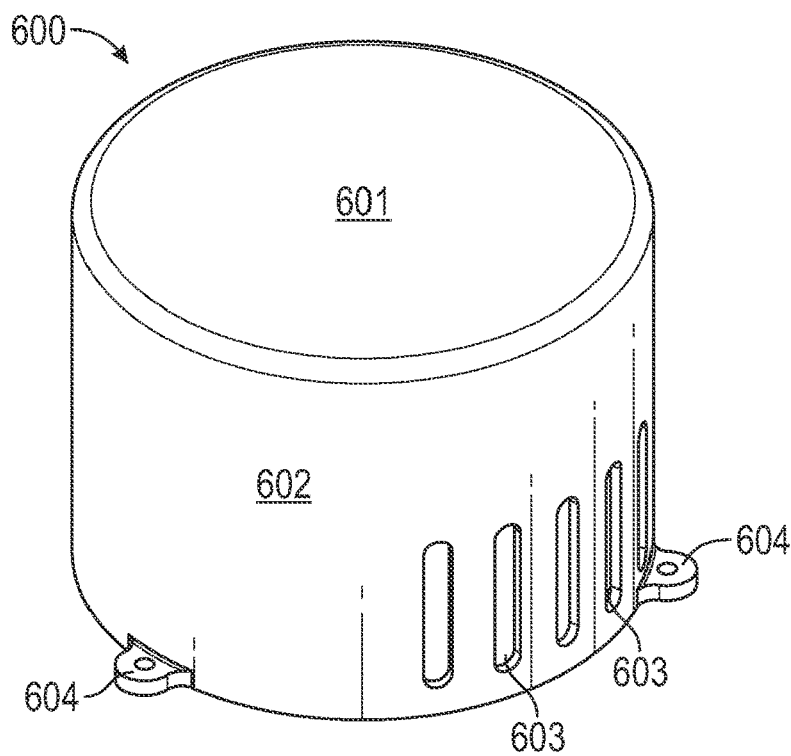
FIG. 6A shows a top perspective, component view of a top cap that is shown to be implemented within the TAZ embodiment of FIG. 5A.
Figure 6B:
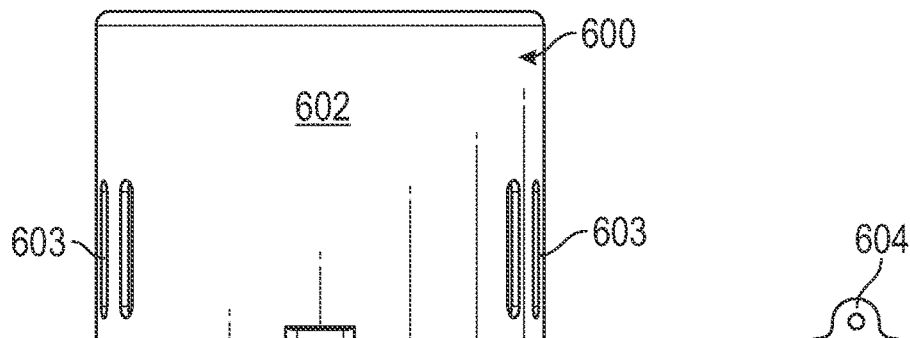
FIG. 6B shows a front elevational, component view of the top cap of FIG. 6A.
Figure 6C:
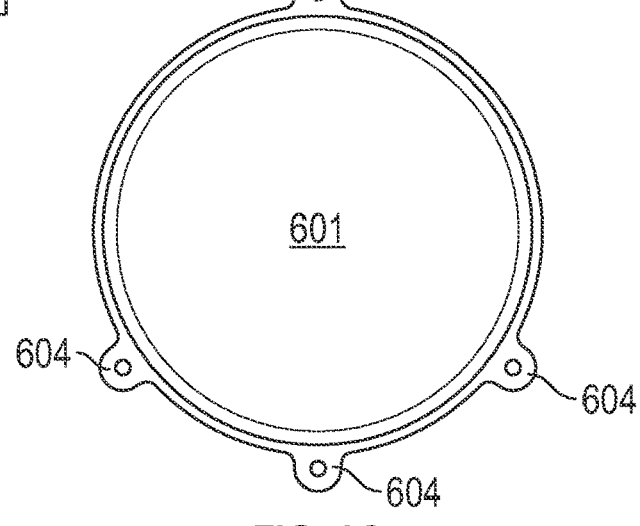
FIG. 6C shows a top elevational, component view of the top cap of FIG. 6A.
Figure 6D:
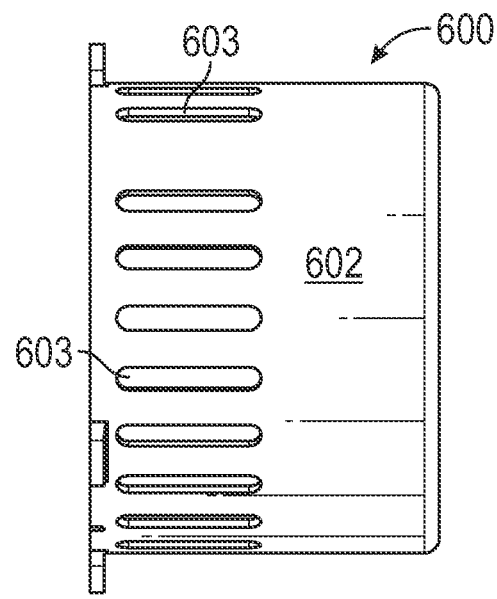
FIG. 6D shows a side elevational, component view of the top cap of FIG. 6A.
Figure 6E:
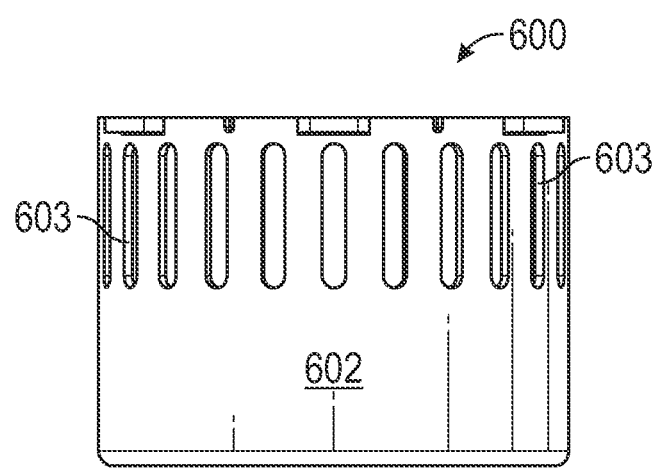
FIG. 6E shows a rear elevational, component view of the top cap of FIG. 6A.
Figure 7:
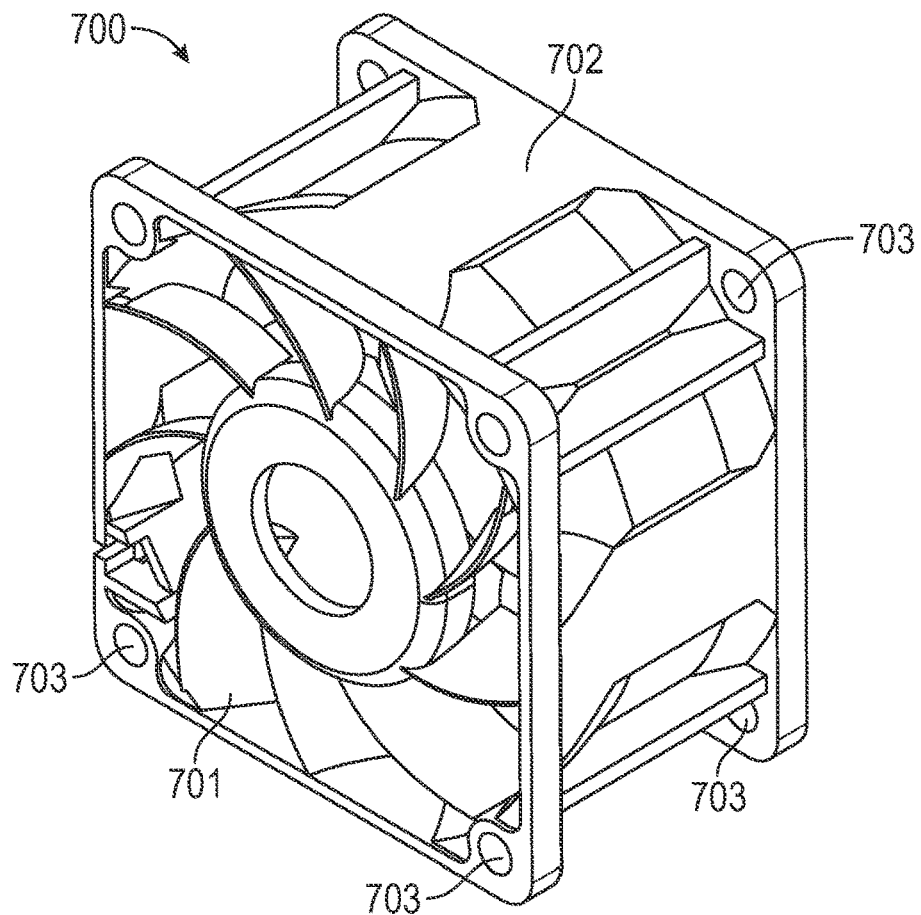
FIG. 7 shows a perspective, component view of a fan that is shown to be implemented within the TAZ embodiment of FIG. 5A.
Figure 8A:
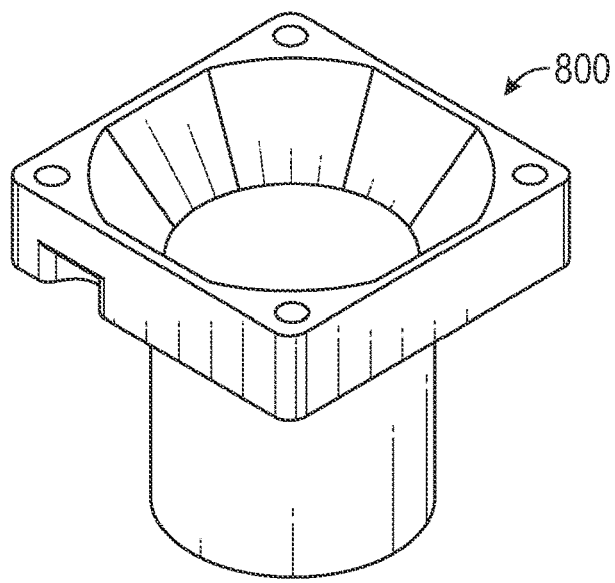
FIG. 8A shows a top perspective, component view of a fan plate that is shown to be implemented within the TAZ embodiment of FIG. 5A.
Figure 8B:
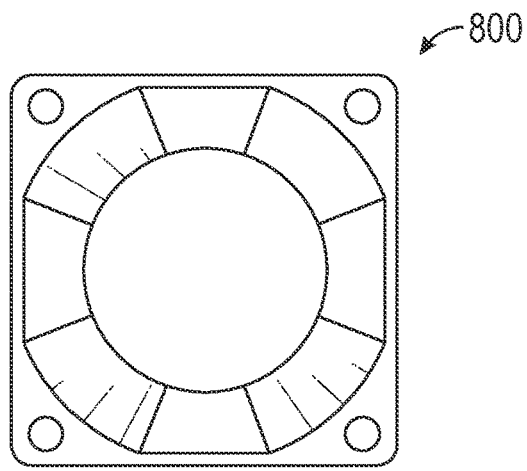
FIG. 8B shows a top elevational, component view of the top cap of FIG. 8A.
Figures 8C, 8D:
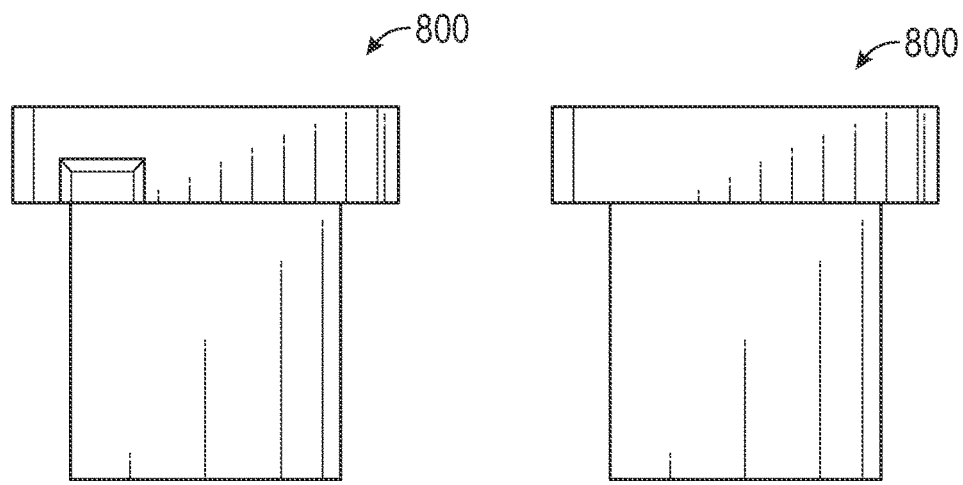
FIG. 8C shows a front elevational, component view of the top cap of FIG. 8A.
FIG. 8D shows a side elevational, component view of the top cap of FIG. 8A.
Figure 8E:
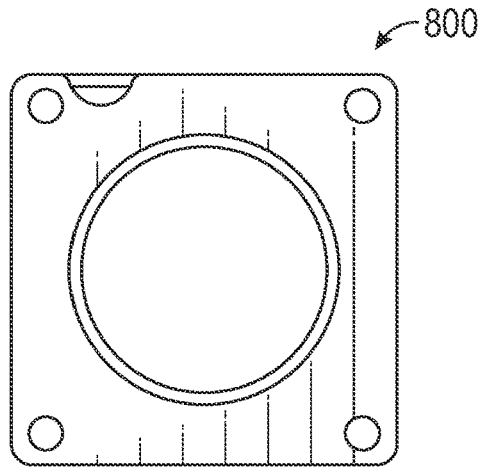
FIG. 8E shows a bottom elevational, component view of the top cap of FIG. 8A.
Figure 10A:
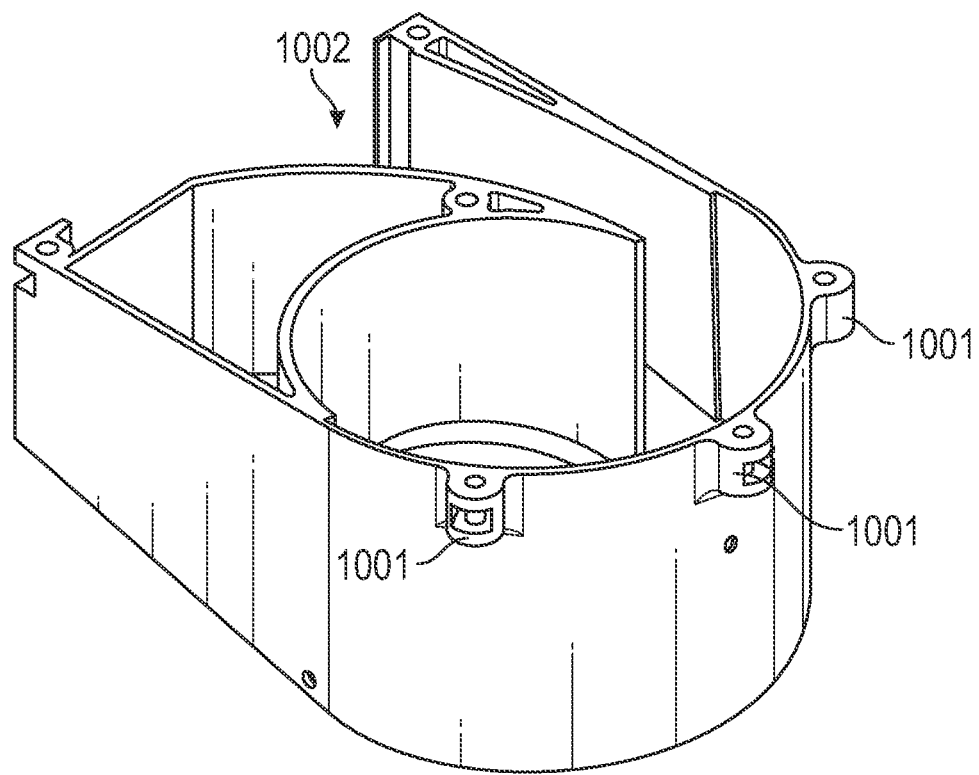
FIG. 10A shows a top perspective, component view of a scroll shaped housing that is shown to be implemented within the TAZ embodiment of FIG. 5A.
Figure 10B:
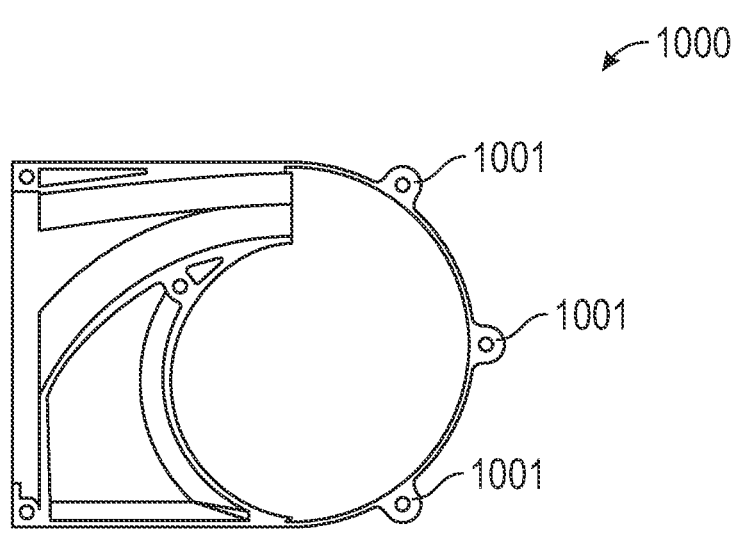
FIG. 10B shows a top elevational view of the scroll shaped housing of FIG. 10A.
Figure 10C:
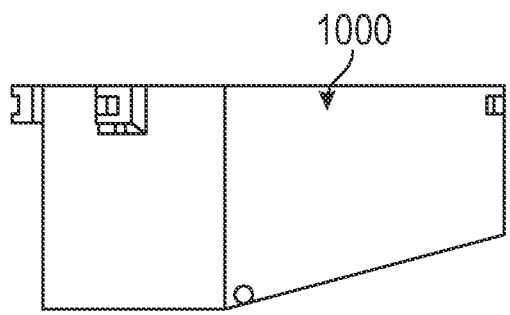
FIG. 10C shows a front elevational view of the scroll shaped housing of FIG. 10A.
Figure 10D:
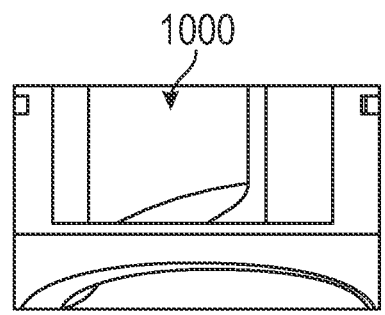
FIG. 10D shows a left-side elevational view of the scroll shaped housing of FIG. 10A.
Figure 10E:
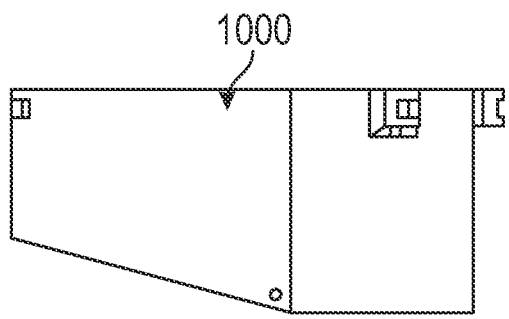
FIG. 10E shows a rear elevational view of the scroll shaped housing of FIG. 10A.
Figure 10F:
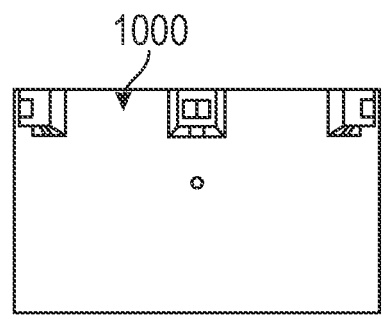
FIG. 10F shows a right-side elevational view of the scroll shaped housing of FIG. 10A.
Figure 10G:
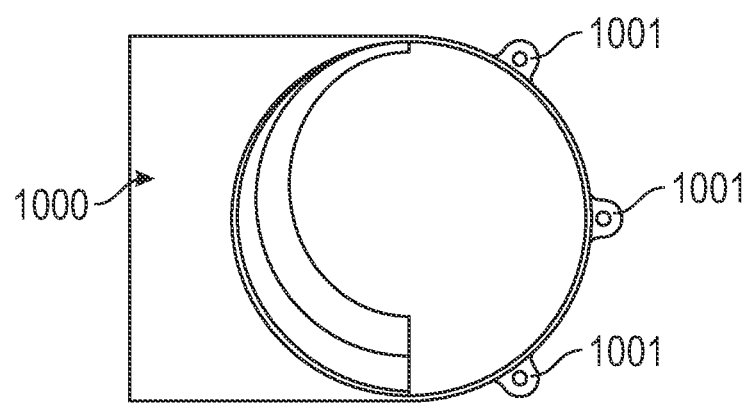
FIG. 10G shows a bottom elevational view of the scroll shaped housing of FIG. 10A.
Figure 11A:
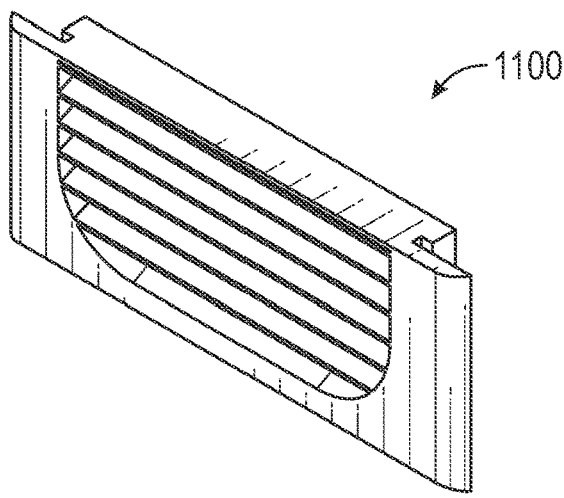
FIG. 11A shows a top perspective, component view of a grille that is shown to be implemented within the TAZ embodiment of FIG. 5A.
Figure 11B:
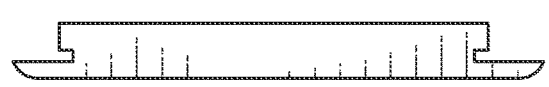
FIG. 11B shows a top elevational view of the grille of FIG. 11A.
Figure 11C:
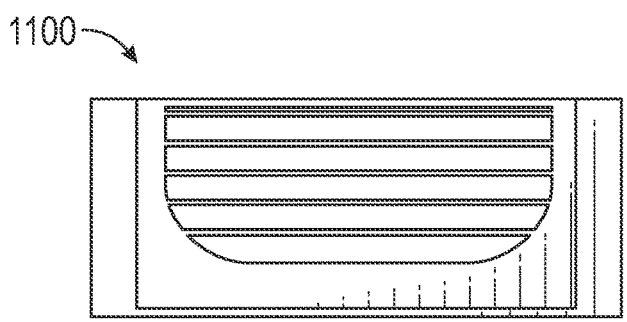
FIG. 11C shows a front elevational view of the grille of FIG. 11A.
Figure 11D:
FIG. 11D shows a left-side elevational view of the grille of FIG. 11A.
Figure 11E:
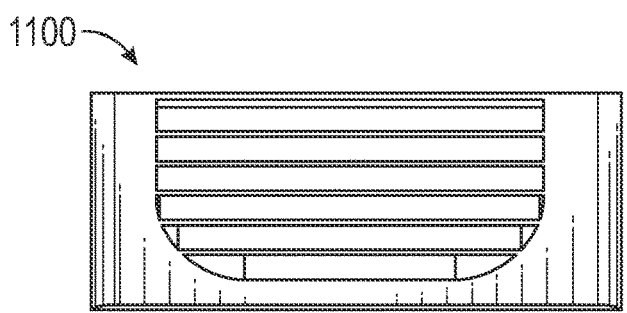
FIG. 11E shows a rear elevational view of the grille of FIG. 11A.
Figure 11F:
FIG. 11F shows a right-side elevational view of the grille of FIG. 11A.
Figure 11G:
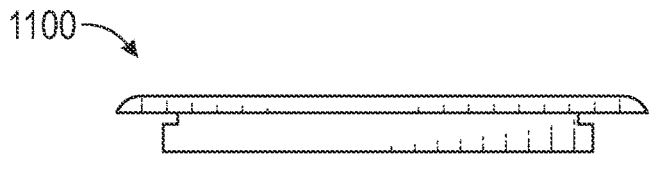
FIG. 11G shows a bottom elevational view of the grille of FIG. 11A.

The base 101 can be configured to sit on the ground in an open field, mount to a building or other type of fixed structure attached to the ground, directly attach to the ground, and/or mount to a moving vehicle. The base 101 in FIG. 1 is shown with rounded edges. Rounded edges can be advantageous where the build 100 is highly portable. Alternatively, the base 101 can include orthogonal edges (see FIG. 4A, discussed infra). Orthogonal edges can be advantageous to improve securement between the base 101 and the ground or external support structures. For example, while collecting air, mounting a base 101 to an external with corresponding, interlocking features can help prevent unwanted rotation of the build 100 and its individual components. The rod 102 can be used to elevate the fluid inlet 1000 to be just above a canopy of a crop being planted in an adjacent field.

The wind vane 103, also called a weathervane or weathercock, is the instrument used to determine the direction of the wind. The wind vane 103 is not a required component, and outside of its function of helping to determine the direction of the wind, can also help improve the aesthetics of the overall air capture and genetic analysis device and build 100. Wind vanes 103 in some embodiments can further be configured to discourage birds from disturbing and feeding on recently cast seed and growing crops, similar to how scarecrows function. In some embodiments, the wind vane 103 comprises plexiglass. In yet other embodiments, the wind vane 103 will act as a counterweight to components of the air capture and genetic analysis device and build 100 that are mounted to the rod 102 on an opposite side of mounting plate 104.

In many of the embodiments shown throughout the figures, the means for harnessing renewable energy are solar panels 105. Various supports 106 for the solar panels will help keep the solar panels 105 in a stable position throughout the day. Like the base 101, the supports 106 can be configured to sit on the ground, on a fixed structure, or on the outside of a moving vehicle. It is to be appreciated that in some embodiments, the angled orientation and/or position of the supports 106 can be, adjusted with mechanical or electrical actuators such as by remote control, and/or automatically biased to face directly into the sun as often as possible. As the solar panels 105 harness energy from sunlight, the energy can be stored in a battery 204 housed within an electrical box 200 having a front wall 201, sidewalls 202, bottom wall 203, and rear wall 209 (see FIG. 4A, discussed infra).

It is to be appreciated there are many configurations in which solar panels 105 could be laid out in order to best harness solar energy depending on the application in which they are employed. In one such non-limiting example, instead of having a flat vertical wind vane 103 and separate solar panels 105, the build 100 can include a molded plastic more in a profile, similar to a filled elongated cross. Across the top, there can be two (one on each side) solar panels 105. The two solar panels 105 can both be set at 30° (opposing 30° angles) either resting permanently on top of a molded plastic that is completely static or they can be on a piece of plastic where the angle is adjustable. The solar panel 105 can thus be part of the device 100 and still be lightweight. Then, as the device 100 rotates to be in the direction of the wind, there will always be a solar panel 105 appropriately situated to best harness energy from the sun.

Figure 2:
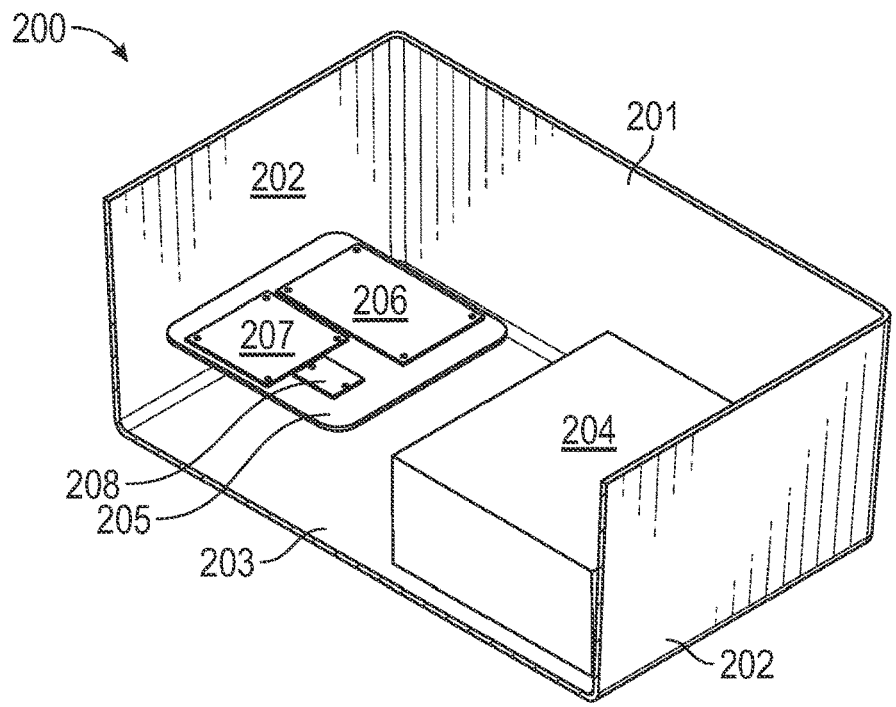
FIG. 2 shows a partially hidden view of an exemplary electrical box usable with one or more of the air capture and genetic analysis devices described herein.
Figure 3:
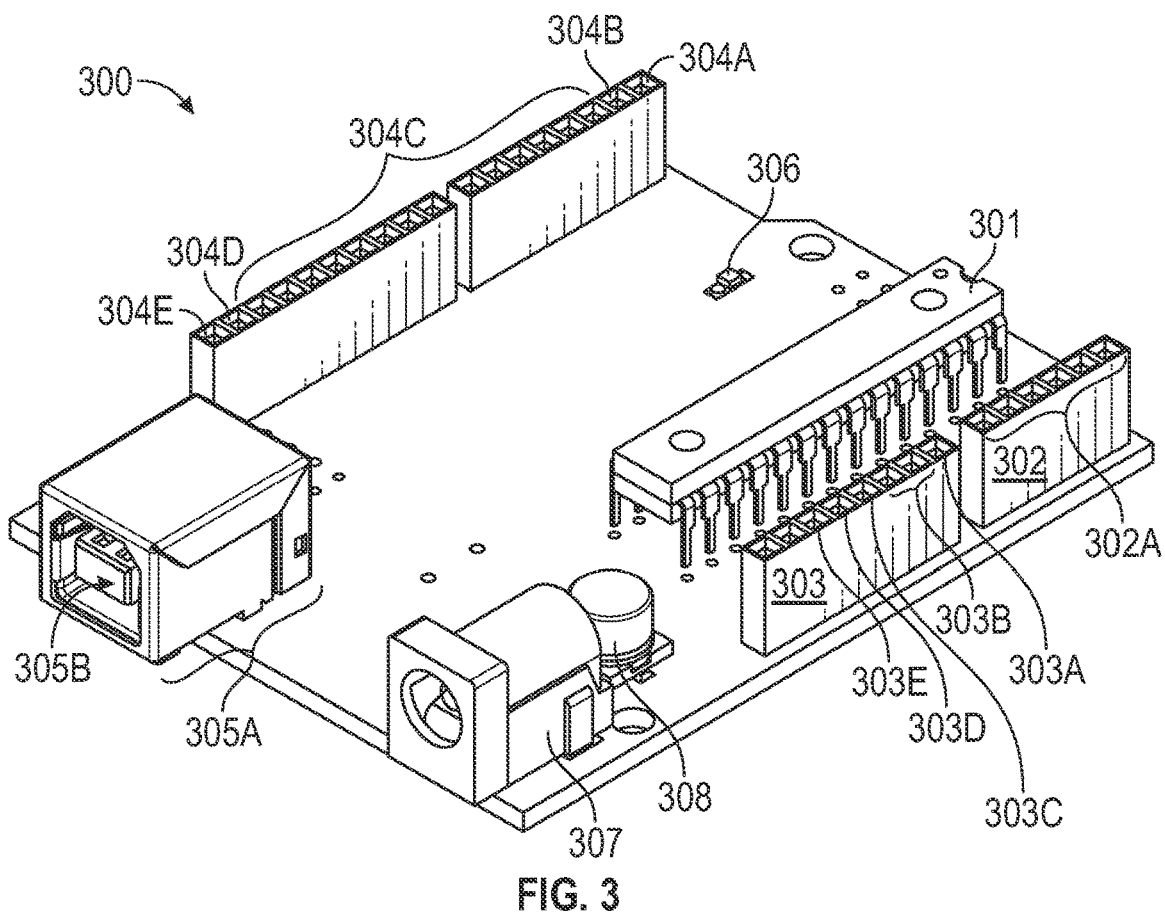
FIG. 3 shows a perspective view of a microcontroller assembly that can be contained within the electrical box of FIG. 2, according to some aspects of the present invention.

FIGS. 2-3 depict further aspects of exemplary components that can makeup the guts of electrical box 200. The battery 204 is preferably a flooded lead acid battery, a type of wet cell battery used as a deep cycle solar battery. The battery 204 can also be a Lithium ion based solar battery, such as a lithium iron phosphate battery. The use of lithium-ion based solar batteries can be more cost-effective over time.

The electronics box 200 also includes an inner panel 205, a carrier board 206, a power management module 207, and a mosfet board 208. The inner panel 205 can be used to electrically connect components of the electronics box 200, such as carrier board 206, power management module 207, and mosfet board 208, to other electrical components of the air capture and genetic analysis device and build 100.

The carrier board 206 is the breadboard/motherboard that acts as the main printed circuit board ("PCB") for the digital components of the air capture and genetic analysis device and build 100. The carrier board 206 holds and allows communication between many of the crucial electronic components of a system, such as the central processing unit (CPU) and memory, and provides connectors for other peripherals. Unlike a backplane, a carrier board 206 usually contains significant sub-systems, such as the central processor (e.g., the microprocessor 301 shown in FIG. 3), the chipset's input/output and memory controllers, interface connectors, and other components integrated for general use.

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

The power management module 207 is a small power and high-efficiency solar power management module. The power management module 207 is preferably designed for a specific voltage (e.g. 5V) emitted by the solar panels 105. The power management module 207 can feature a maximum power point tracking ("MPPT") function, maximizing the efficiency of the solar panels 105. The power management module 207 can feature ON/OFF controllable DC-DC converters with an output that satisfies the needs of various solar power projects and low-power applications. The power management module 207 can also employ various protection functions for the battery 204, solar panel 105 and output, which greatly improves the stability and safety of the solar panels 105.

The mosfet board 208 allows a metal-oxide-semiconductor field-effect transistor ("MOSFET") to determine the electrical conductivity of the device. The MOSFET is a type of insulated-gate field-effect transistor that is fabricated by the controlled oxidation of a semiconductor, typically silicon. The voltage of the covered gate determines the electrical conductivity of the device; this ability to change conductivity with the amount of applied voltage can be used for powering a fan (e.g., 700, discussed infra) that can be controlled to a specific voltage based on a PWM signal from the microprocessor), or for amplifying or switching electronic signals.

FIG. 3 shows an open-source microcontroller board 300, an example of such being the Arduino Leonardo, including microcontroller 301. The open-source microcontroller board 300 can be operatively located on the carrier board 206 of FIG. 2. Microcontroller 301 is shown as a single-chip microcontroller that is simple, low-powered, and low-cost. The microcontroller 301 controls automatic aspects of the air collection and data analyses processes.

The microcontroller 301 of FIG. 3 can automatically communicate with and/or control sensors (schematically shown in FIG. 19, discussed infra) of the air capture and genetic analysis device and build 100. Exemplary sensors include, but are not limited to: wind speed sensors, such as anemometers; flow sensors (e.g. for measuring a volume and/or rate of flow passing through the air capture and genetic analysis device and build 100); a hygrometer or relative humidity sensor for measuring humidity; a temperature sensor (e.g. thermocouples, thermometers, etc.); a photodetector; video camera (e.g. an active camera that automatically estimates the leaf area index (LAI), a measure for the total area of leaves per unit ground area and directly related to the amount of light that can be intercepted by plants), and/or other known types of light/vision sensors; audio detectors, such as microphones; air composition sensors, which further include pollution sensors, smoke detectors, and the like; soil sensors, such as mineral and/or moisture sensors; pressure sensors; and position sensors, such as those that connect to the Global Positioning System ("GPS") and an inertial measurement unit ("IMU") sensors to know if the device has fallen. For example, the use of one or more of these sensors may help provide for the ability to automatically bias the supports 106 so as to cause the solar panels 105 to face directly into the sun as often as possible. In yet another non-limiting example, thermal sensors can also be beneficial in maintaining proper operation of electrical equipment within electronics box 200.

The open-source microcontroller board 300 also includes digital input/output header 302 having analog input pins 302A; a power header 303 having a voltage in pin 303A, ground pins 303B, a 5V pin 303C, a 3.3V pin 303D, a reset pin 303E; digital input/output headers having a serial receiving pin 304A, serial transmitting pin 304B, digital input/output pins 304C, digital ground pin 304D, and analog reference pin 304E; a USB shell 305A, a USB core 305B; power LED indicator 306, DC power jack 307, and capacitor(s) 308 for smoothing the power supply.

The digital input/output header 302 helps brings out the digital input and output signals on the open-source microcontroller board 300.

The power header 303 allows connection to the power pins 303A. This allows the power header 303 to borrow a power connection from the USB components 305A/305B or the DC jack 307 and use that bowered power to drive a fan motor, sensor, etc.

The digital input/output headers utilize the serial receiving pin 304A, serial transmitting pin 304B, digital input/output pins 304C, digital ground pin 304D, and analog reference pin 304E to control a relay, blink, and LEDs, listen for switches, or even to connect to more complex components. In one embodiment, the digital input/output headers utilize five volts (5V) for 'high' signals, and zero volts (0V) for 'low' signals.

The digital input/output pins 304C can monitor any voltage present as a high impedance input and supply or sink current as a high or low voltage digital output. The digital input/output pins 304C pins are usually organized in groups of eight and referred to as a port.

FIGS. 4A-D shows an alternative embodiment for the build 400 wherein the build 400 implements use of TAZ 500. Further details of the TAZ 500 are shown in FIGS. 5A-G. Like the air capture and genetic analysis device and build 100, the build 400 with TAZ 500 utilizes base 101, rod 102, wind vane 103, solar panels 105, and solar panel supports 106. In this instance, the solar panel base 101 and solar panel supports 106 work in tandem to provide greater stability to the solar panels 105 while sacrificing some at least some portability of the overall device. The embodiment shown in FIGS. 4A-4D can be particularly beneficial where the build is going to be located at a single location for an extended period of time.

The build 400 with TAZ 500 also differs from the build 100 shown in FIG. 1 because the assembly used to mount the TAZ 500 permits the TAZ to rotate a full three hundred-sixty degrees (360°). In particular, the build 400 utilizes a flange 401 to mount a main body 402 to a ball bearing 403 capable of rotating. The ball bearing 403 is also mechanically attached to a square tube 404, which at one end is attached to the wind vane 103 and at the other attached to the TAZ 500.

The TAZ 500 includes a top cap 600, a fan 700 (internal component), lower fan plate 800 (internal component), collection plate 900, scroll shaped housing 1000 with fluid inlet 1002 (through grille 1100), grille 1100, big bottle with cutout 1200, cartridge 1300, and removable tube holder 1400. Further details of each of these components are shown from FIG. 6A through FIG. 14E.

For example, as shown in FIGS. 6A-6E, the top cap 600 is a hollow cylindrical body open at one end. The top cap 600 can include an approximately circularly shaped ceiling 601, a circumferential wall 602 protruding downward from said ceiling 601, fluid outlets 603 (shown as elongated slots) located within the circumferential wall 602 to allow air to flow therethrough, and mounting tabs 604. The mounting tabs 604 include apertures which allow fasteners such as screws or bolts to mount the top cap 600 to a collection plate 900.

The top cap 600 houses fan 700 and fan plate 800. The fan 700 includes an impeller 701 that when operated spins blades (rotors) that pull a fluid (such as air) through the fan 700. The impeller 701 increases the pressure and flow of the fluid. The impeller 701 has a central hub with attached vanes and is mounted on a central shaft. The vanes are shown attached to an outer wall of the housing 702, making the impeller 701 a semi-closed impeller. Air can enters an eye of the impeller 701, and the vanes add energy and direct the air to a nozzle discharge. A close clearance between vanes and a back plate of the impeller housing 702 can help prevent air from flowing back into the impeller 701. The semi-closed nature of the impeller 701 can help retain particles in the air long enough so that they can be collected by the collection plate 900 before the air is returned to the environment. The fan housing 702 can act as the stator of the fan 700. The fan housing can include mounting apertures 703 that allow fasteners such as screws or bolts to mount the fan 700 to fan plate 800, said fan plate 800 being shown in FIGS. 8A-8E.

Further aspects of the collection plate 900 are shown in FIGS. 9A-9C, which include an irregularly shaped plate with asymmetrically located collection plate attaching apertures 901, collection plate mounting apertures 902, and collection plate fluid opening 903 that allows fluid to pass therethrough.

The scroll shaped housing 1000 with the fluid inlet 1002 can be seen in FIGS. 10A-G. The scroll shaped housing 1000 includes housing mounts 1001, some of which are external tabs. The fluid inlet 1002 can be covered by grille 1100 (FIGS. 11A-11G). The grille 1100 includes slits big enough to allow particles in air sized one to one-hundred microns to still be able to pass therethrough. The grille 1100 is located at the front of the scroll shaped housing 1000. The grille 1100 is a grating forming a barrier or screen. The slits in the grille 1100 are partly functional in that they can help filter air, but can also be ornamentally arranged so as to appeal to particular persons or causes.

Figure 12:
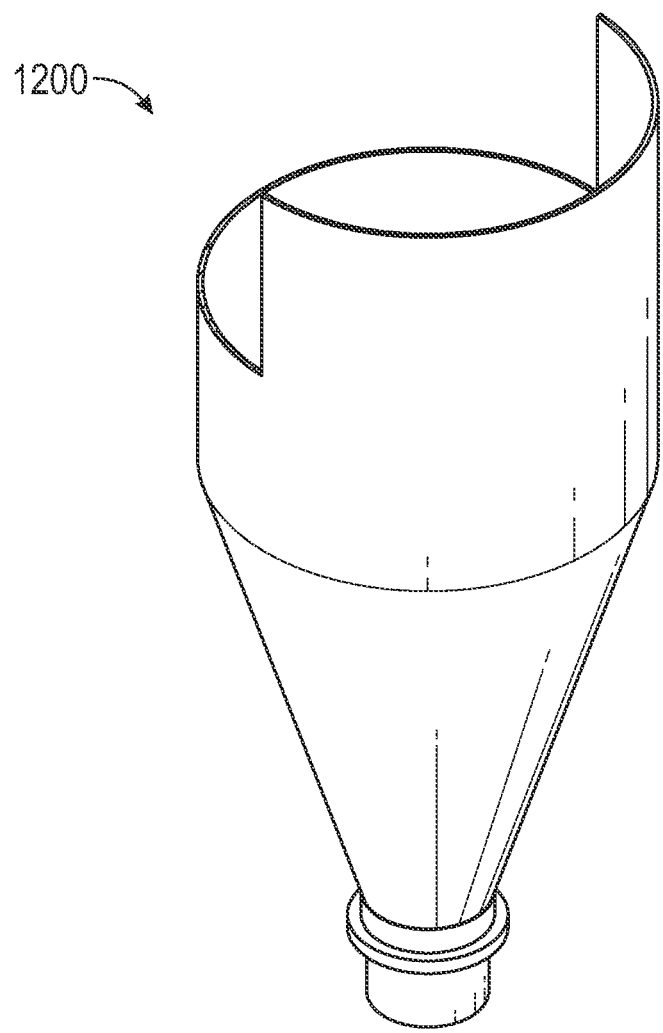
FIG. 12 shows a top perspective, component view of a big bottle with a cutout that is shown to be implemented within the TAZ embodiment of FIG. 5A.
Figure 13A:
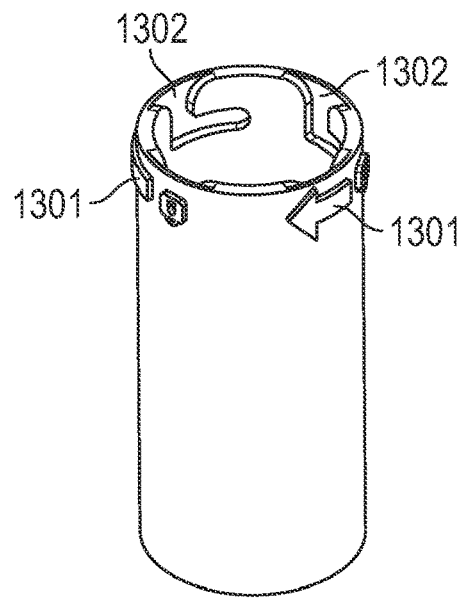
FIG. 13A shows a top perspective, component view of a collection cartridge that is shown to be implemented within the TAZ embodiment of FIG. 5A.
Figure 13B:
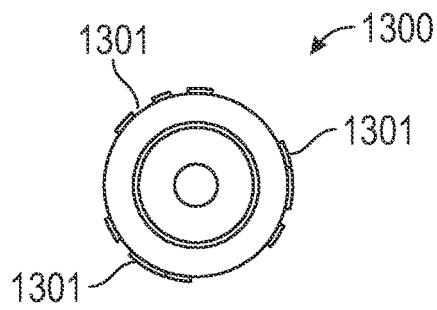
FIG. 13B shows a top elevational view of the collection cartridge of FIG. 13A.
Figure 13C:
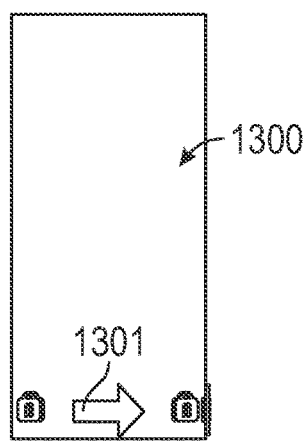
FIG. 13C shows a front elevational view of the collection cartridge of FIG. 13A, mirrored about the y-axis.
Figure 13D:
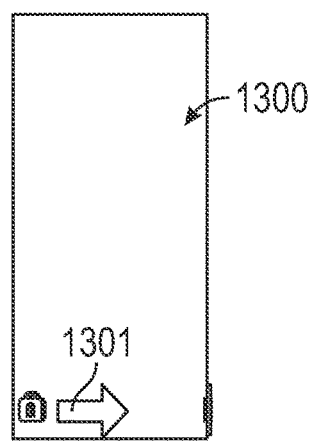
FIG. 13D shows a side elevational view of the collection cartridge of FIG. 13A, mirrored about the y-axis.
Figure 13E:
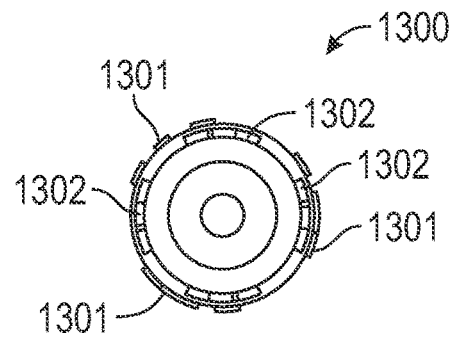
FIG. 13E shows a bottom elevational view of the collection cartridge of FIG. 13A.
Figure 14A:
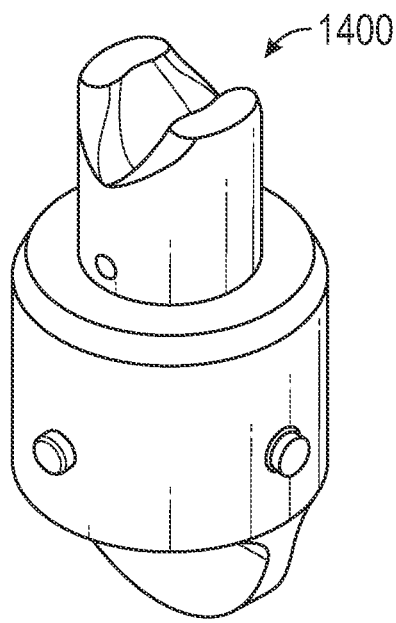
FIG. 14A shows a top perspective, component view of a tube holder that is shown to be implemented within the TAZ embodiment of FIG. 5A.
Figure 14B:
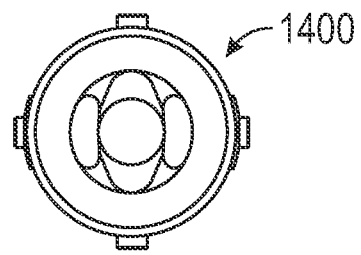
FIG. 14B shows a top elevational view of the tube holder of FIG. 14A.
Figure 14C:
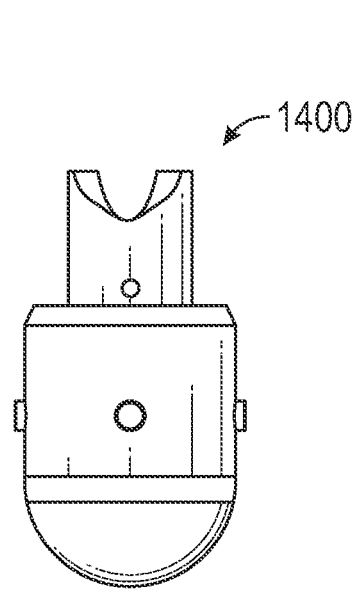
FIG. 14C shows a front elevational view of the tube holder of FIG. 14A.
Figure 14D:
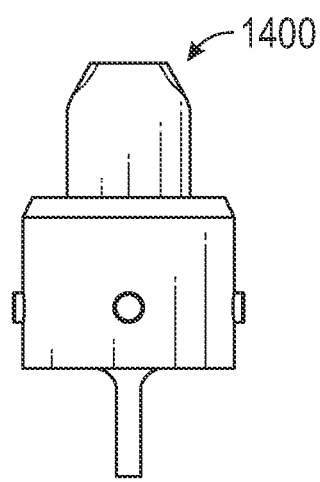
FIG. 14D shows a side elevational view of the tube holder of FIG. 14A.
Figure 14E:
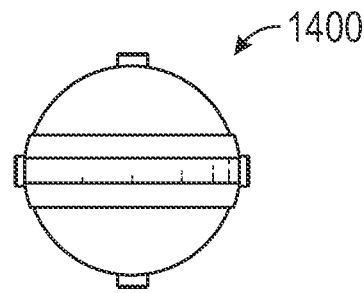
FIG. 14E shows a bottom elevational view of the tube holder of FIG. 14A.
Figure 15A:
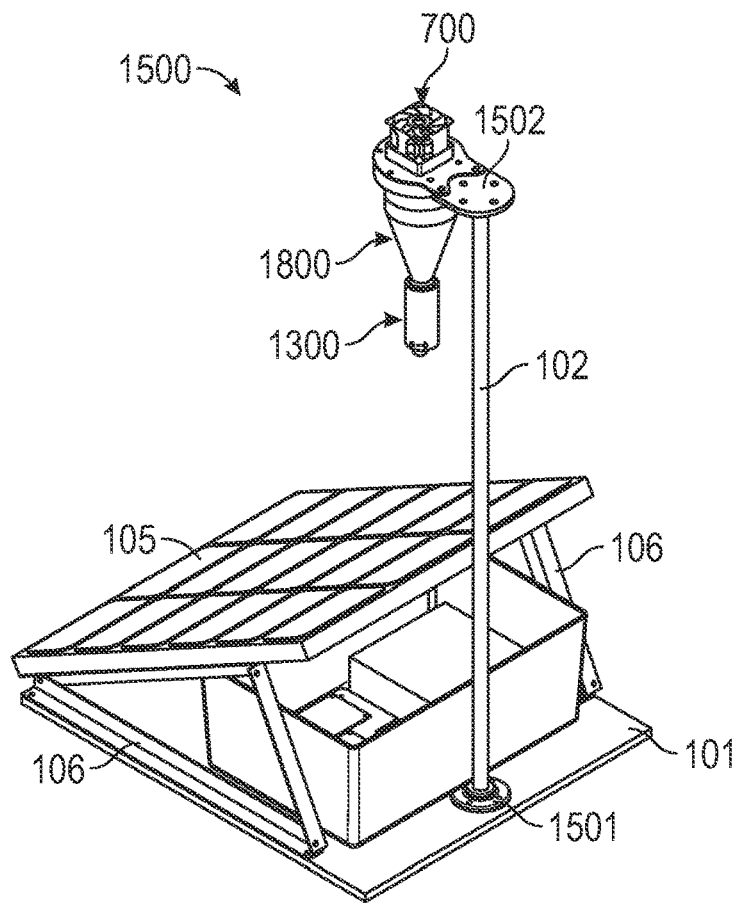
FIG. 15A shows a rear perspective view of an exemplary air capture and genetic analysis device embodied within a third build, according to some aspects of the present disclosure.
Figure 15B:
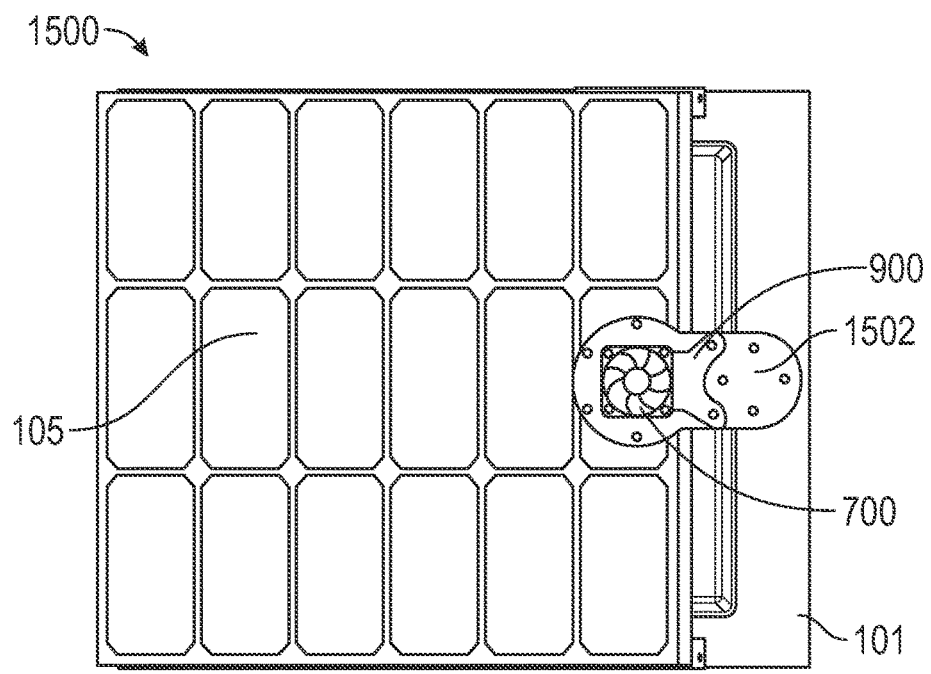
FIG. 15B shows a top elevational view of the second build of FIG. 15A.
Figure 15C:
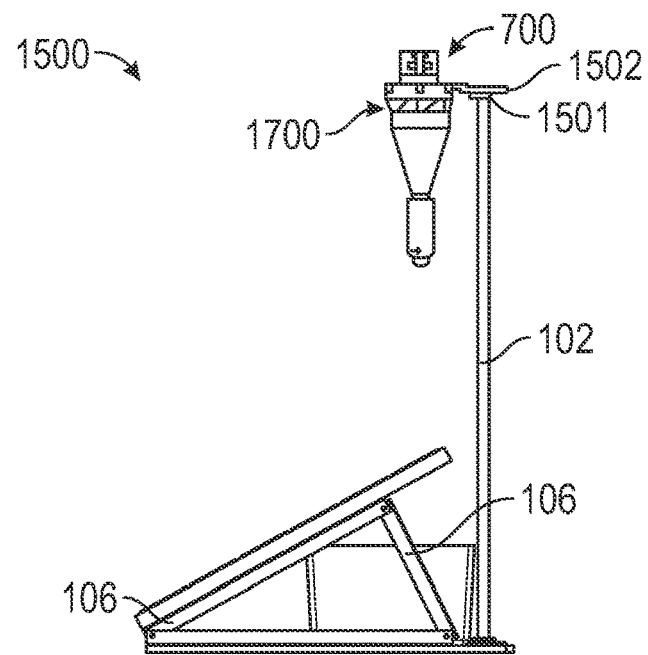
FIG. 15C shows a side elevational view of the second build of FIG. 15A.
Figure 15D:
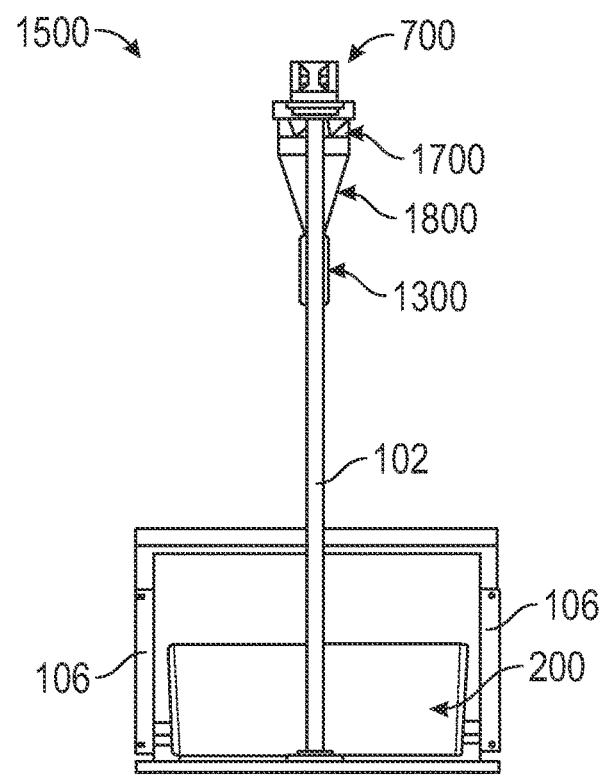
FIG. 15D shows a rear elevational view of the second build of FIG. 15A.
Figure 16A:
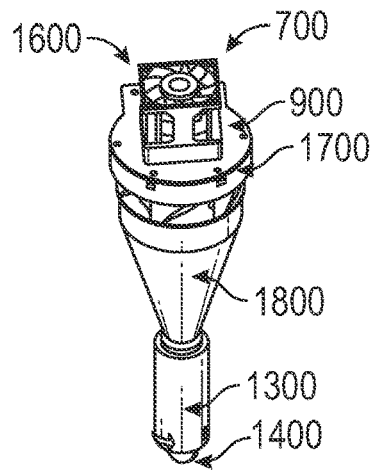
FIG. 16A shows a side perspective view of an exemplary air capture and genetic analysis device, the dry cyclone embodiment, implemented within the build of FIG. 15A.
Figure 16B:
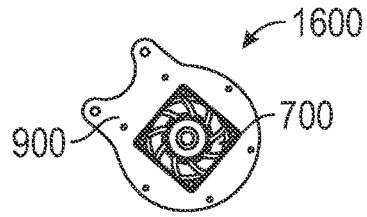
FIG. 16B shows a top elevational view of the dry cyclone embodiment of FIG. 16A.
Figure 16C:
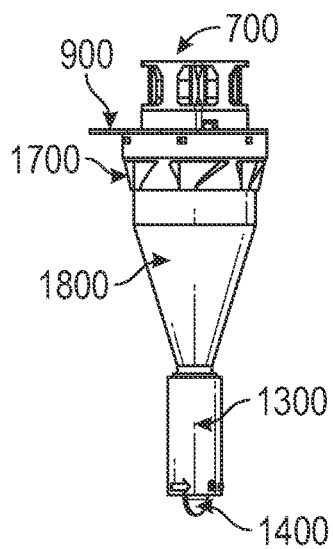
FIG. 16C shows a front elevational view of the dry cyclone embodiment of FIG. 16A.
Figure 16D:
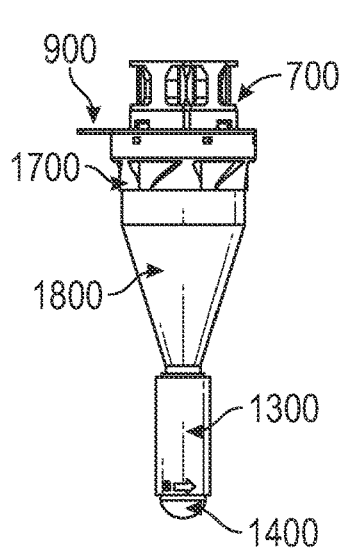
FIG. 16D shows a left-side elevational view of the dry cyclone embodiment of FIG. 16A.
Figure 16E:
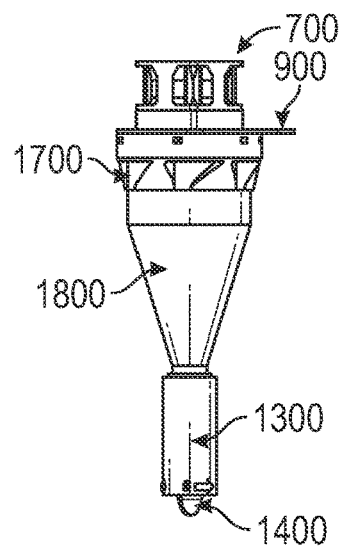
FIG. 16E shows a rear elevational view of the dry cyclone embodiment of FIG. 16A.
Figure 16F:
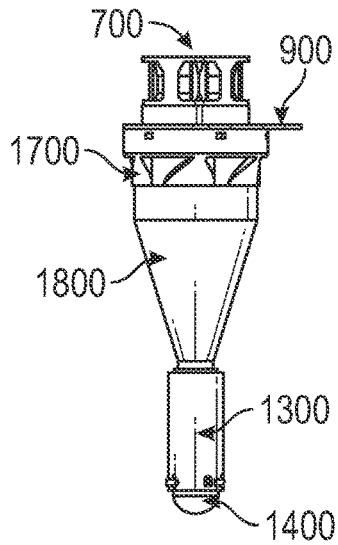
FIG. 16F shows a right-side elevational view of the dry cyclone embodiment of FIG. 16A.
Figure 16G:
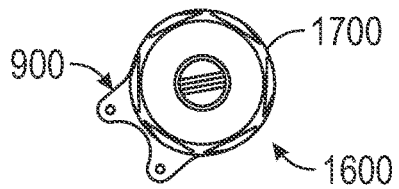
FIG. 16G shows a bottom elevational view of the dry cyclone embodiment of FIG. 16A.
Figure 17A:
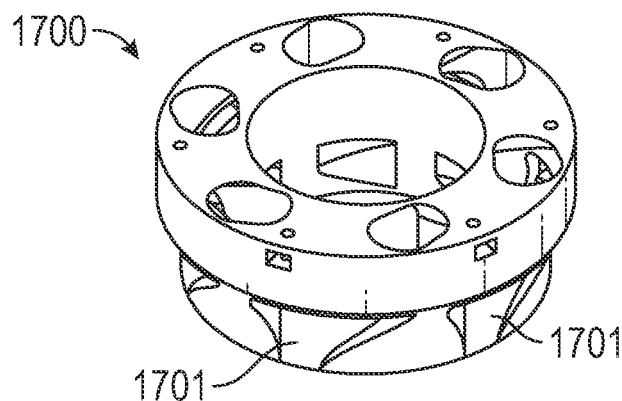
FIG. 17A shows a top perspective, component view of a circular intake that is shown to be implemented within the dry cyclone embodiment of FIG. 16A.
Figure 17B:
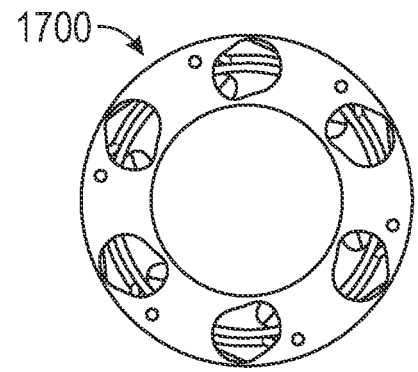
FIG. 17B shows a top elevational view of the circular intake of FIG. 17A.
Figure 17C:
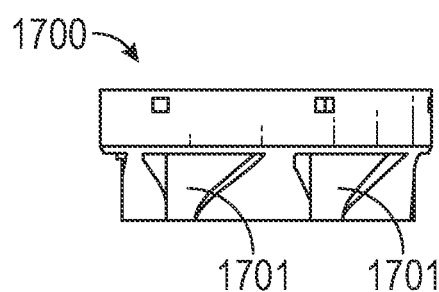
FIG. 17C shows a front elevational view of the circular intake of FIG. 17A.
Figure 17D:
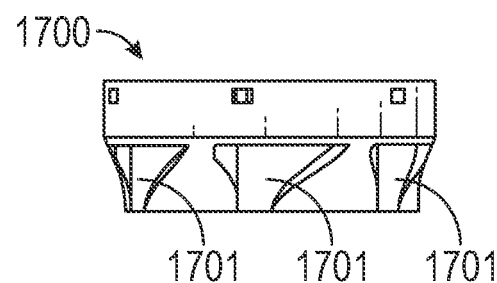
FIG. 17D shows a side elevational view of the circular intake of FIG. 17A.
Figure 17E:
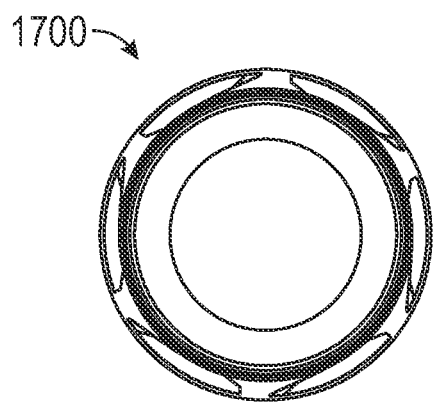
FIG. 17E shows a bottom elevational view of the circular intake of FIG. 17A.

The big bottle 1200 shown in FIG. 12 includes a narrower fluid exit than the fluid opening so as to increase speed and pressure of the particles toward the cartridge 1300, which is shown in FIGS. 13A-13E.

The cartridge 1300 attaches to the tube holder 1400 via notches/channels 1302 in the cartridges 1300 and bumps in the tube holder 1400. The components may be pushed together and twisted until locked. The components may also be twisted in relation to one another until the bumps line up with an exit/entrance portion of the channel and pulled apart to facilitate unlocking. A taper and/or slight interference fit may be employed to improve the lock between the cartridge 1300 and the tube holder 1400 when the cartridge 1300 is in a locked, operable position. The tube holder 1400 thus allows the cartridge 1300 to be emptied (e.g. for cleaning/to restart the method) without having to remove the entire cartridge 1400 from the TAZ 500/build 400.

In alternative embodiments, the air capture and genetic device can further comprising a means for allowing fog water to drip through a well of the collection zone (e.g., near the big bottle 1200, cartridge 1300 and/or tube holder 1400) during collection but not during analysis, said means optionally comprising a membrane.

FIGS. 15A-D shows an alternative embodiment for the build 1500 wherein the build 1500 implements use of a dry cyclone 1600, with further details of the cyclone 1600 being shown in FIGS. 16A-G. Like the TAZ 500, the cyclone 1600 is shown utilizing a fan 700, collection plate 900, cartridge 1300, and tube holder 1400. The cyclone 1600 however differs from the TAZ 500 in that the cyclone 1600 utilizes a circular intake 1700 and a big bottle 1800 shaped to accommodate said circular intake 1700. For example, the dry cyclone 1600 is able to collect cleaner samples in part because the dry cyclone 1600 employed can filter approximately three hundred ninety three liters per minute (393 L/min). Other air sampling devices known in the art typically range from ten liters per minute to forty liters per minute (10-40 L/min).

FIGS. 17A-E shows a circular intake 1700 capable of intaking fluid via fluid inlets 1701 positioned at multiple locations dispersed about a circumferential perimeter of the cyclonic fluid housing.

Figure 18:
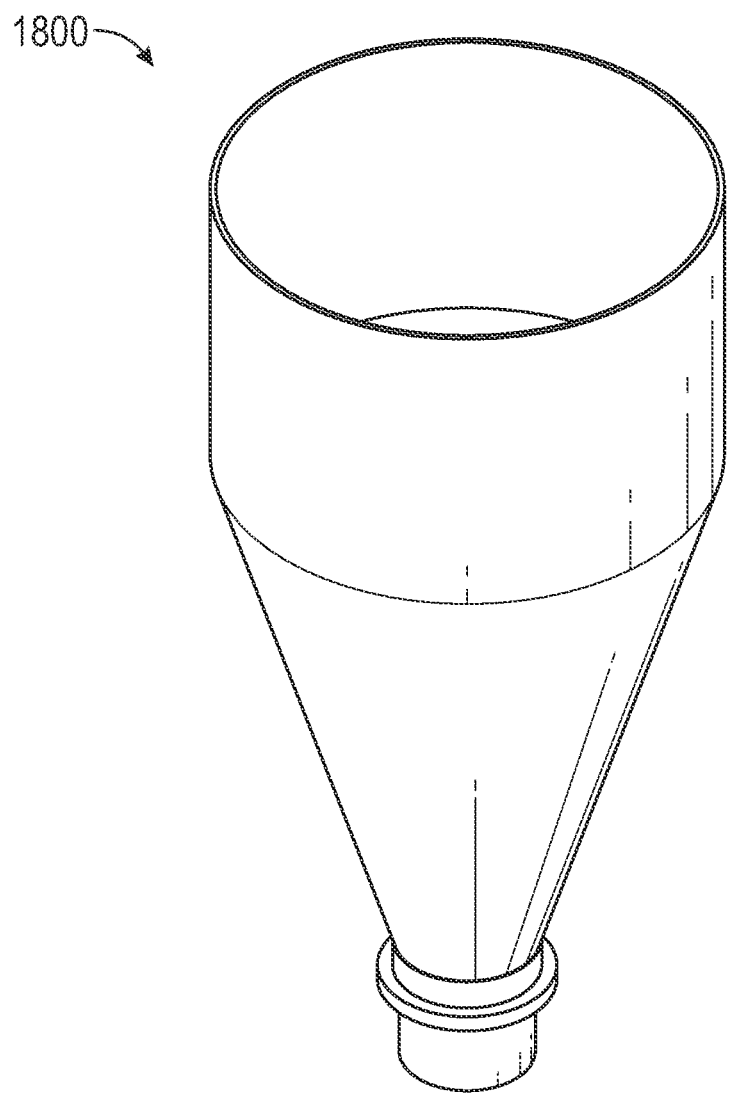
FIG. 18 shows a top perspective, component view of a big bottle without a cutout that is shown to be implemented within the dry cyclone embodiment of FIG. 5A.

FIG. 18 shows a big bottle 1800 that allows the fluid to move from the circular intake 1700. The big bottle 1800 shown in FIG. 18 does not have a cutout to accommodate the circular intake 1700, as the circular intake 1700 can attach and/or secure to a top portion of the big bottle 1800. In some embodiments, the external surfaces of both components will be flush. While in others, a lower portion of the circular intake 1700 could fit snuggly via interference fit into an upper portion of the big bottle 1800.

Figure 19:
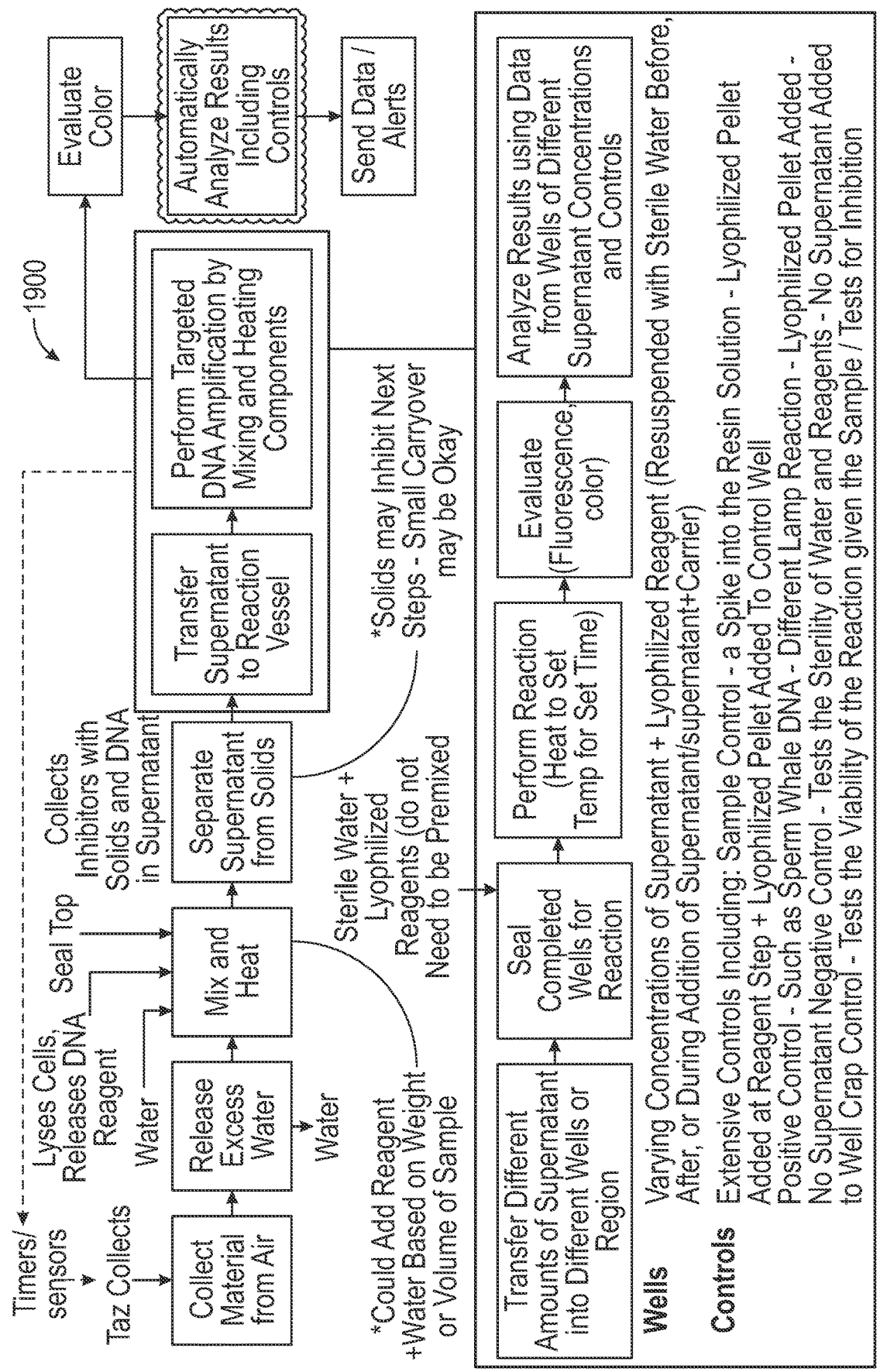
FIG. 19 shows a schematic view of an automated process for capturing air and analyzing the genetic makeup of particles within the air.

FIG. 19 shows a flow diagram of a process 1900 utilizing a single device to capture spores and analyze the DNA of same. Known processes in the art require persons in a laboratory to analyze DNA separately from collection of the spores.

The devices described herein are able to perform analysis in-field, which offers an easier, more robust, one-step extraction of DNA. Centrifugation using this one-step extraction of the DNA is not necessarily required. There is so much DNA collected during the process that it is beneficial to dilute the DNA. This allows for the reduction of inhibitors to molecular biology and use of a millifluidic approach. The millifluidic approach is more robust than a microfluidic because it relies less on non-essential surface interactions and can be gravity-fed.

The device can be automated through the use of sensor(s) and/or timer(s), which control how often to operate the device so as to collect material. The time period and/or sensed needs that trigger collection of material will vary depending on application. The sample analysis process uses components that are especially robust and/or treated to increase the shelf life in field conditions such as lyophilization, salts, or other methods.

The single collection device will collect material from the air near-continuously, sporadically, at set times, or until the material is full to accomplish genetic analysis. The time spent collecting the material and/or amount of material can be determined by optional timers and/or sensors included in the system. During or after the material has been collected from the air, excess water can be released. The collected material may be mixed or not with water and/or reagents to aid in lysis; and the spores or cells of the collected material could then be lysed. A supernatant can, but is not required to, be extracted therefrom. In some embodiments, the DNA is in the supernatant. Other embodiments can exist where no supernatant is employed. For example, magnetic beads can be employed and moved with a magnet. In yet other examples, the DNA could be washed through a membrane. The variance (+/−) of different quantities of supernatant essentially creates a dilution series. The series of dilutions and +/− can be tested to analyze material captured from outside air/farm fields. For example, the dilution series can be used for quantification. The series of dilutions can comprise a range of concentrations with a +/− and the series of dilutions is done by shunting different amounts of magnetic beads or liquid.

Thereafter, the supernatant is separated from other solids in the reagent, and the supernatant can be transferred to a reaction vessel. Different amounts of supernatant can be transferred into different wells or regions. The wells or regions can then be sealed to prepare for use of a reaction that amplifies the supernatant.

In a non-limiting example, a LAMP reaction can then be used by mixing and heating components. LAMP is a type of isothermal amplification where all of the reagents can be lyophilized making them stable in the field over time. However it is to be appreciated any number of technologies could be used to amplify and/or detect a nucleic acid, including PCR-based amplification, Crispr/CAS or probes/microarrays, nucleic acid lateral flow strips, fluorescence in-situ hybridization, and/or optical electric sensors. Quantification can be done with a number of methods including dyes, stains, FRET-based assays, electromagnetic resonance, or by allowing the DNA bind and change a voltage. One or more of these technologies could also be used to identify the organism present and quantity thereof including antibodies.

In the LAMP reaction, the target sequence can be amplified at a constant temperature between one-hundred forty to one-hundred fifty degrees Fahrenheit (° F.) using either two or three sets of primers and a polymerase with high strand displacement activity in addition to a replication activity. The preferred temperature is approximately one-hundred forty-five degrees Fahrenheit (° F.). Four different primers can be used to amplify six distinct regions on the target gene, which increases specificity. An additional pair of loop primers can further accelerate the reaction. The amount of DNA produced in LAMP can be considerably higher than polymerase chain reaction ("PCR")-based amplification. The amplification product can be detected via photometry. This allows for easy evaluation of color by the naked eye or via simple photometric detection approaches for small volumes. The reaction can be followed in real-time either by measuring the absorbance ("OD") or by fluorescence using intercalating dyes. Dyes, such as the DNA intercalator—Malachite green—can be used in the LAMP reaction for an optical read out that is robust. When DNA is amplified, Malachite green is intercalated, and the solution turns blue-green instead of clear. Many pH indicators (hydroxynaphthol blue ("HNB"), phenol red, etc.) can be used to read LAMP reactions because the pH changes as the DNA is amplified. Care should be taken to address the fact that pH can vary based on what type of material and how much material is collected as dust may invalidate a pH-based analysis.

Another method for visual detection of the LAMP amplicons by the unaided eye was based on their ability to hybridize with complementary gold-bound ss-DNA and thus prevent the normal red to purple-blue color change that would otherwise occur during salt-induced aggregation of the gold particles. So, a LAMP method combined with amplicon detection by AuNP can have advantages over other methods in terms of reduced assay time, amplicon confirmation by hybridization and use of simpler equipment (i.e., there is no need for a thermocycler, electrophoresis equipment or a UV trans-illuminator).

The use of LAMP can be beneficial because LAMP has been observed to be less sensitive (more resistant) than PCR to inhibitors in complex materials such as blood, due in part to use of a different DNA polymerase. LAMP can successfully detect pathogens even from minimally processed materials. This feature of LAMP thus proves useful in low-resource or field settings where a conventional DNA or RNA extraction prior to diagnostic testing is simply impractical. Indeed, optical readouts are also less expensive to procure for the reading apparatus and consumable reagents than fluorescent readouts. Optical readouts can also be used to create a visible color change that can be seen with the naked eye without the need for expensive equipment, or for a response that can more accurately be measured by instrumentation. Dye molecules intercalate or directly label the DNA, and in turn can be correlated with the number of copies initially present. LAMP can thus be quantitative.

A risk assessment that is based on information generated from our device can be produced from satellite data, farm, and weather data to include organism quantity, temperature, humidity, and wind speed and direction. Farm data can include soil moisture, leaf wetness, spray cycle, timing of bud break, crop variety. Interpretation of data can rely on algorithms that factor spore count, temperature, humidity, and other information to provide risk advisories to farmers. High risks to crop yields can result in the automated process automatically generating an alert to let the farmer know there are harmful pathogens threatening the health of the crops.

The computers that run the algorithms and analyze the data do not necessarily need to be implemented with the electronics of the device itself and/or carried out by personal electronic computers owned by the farmers. For example, where computers in a remote location are capable of processing said algorithms and uploading analyzed data to a wireless network, local computers in the field need only include a wireless transceiver capable of transmitting and receiving digital, analog, and/or LoRa based communications to and from the network. In this way, one or more aspects of the method 1900 can be controlled remotely with any suitable computer, such as the farmer's personal electronic device.

Connectivity systems and/or wireless networks (such as cloud-based networks) for relaying the data remotely—can include use of communication protocols such as Bluetooth and Wi-Fi, can utilize cellular networks (likely using a mesh system), and/or use software that can effectively control the relay of data from remote locations, such as the software applications Hologram (see https://www.hologram.io/iot) and/or Swarm (see https://swarm.space).

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| \  | List of Reference Characters |
|---|---|
| 100 | air capture and genetic analysis device and build |
| 101 | base |
| 102 | rod |
| 103 | wind vane |
| 104 | mounting plate |
| 105 | solar panels |
| 106 | supports for solar panels |
| 200 | electrical box |
| 201 | front wall |
| 202 | side wall |
| 203 | bottom wall |
| 204 | battery |
| 205 | inner panel |
| 206 | carrier board |
| 207 | power management module |
| 208 | mosfet board |
| 209 | rear wall |
| 300 | open-source microcontroller board |
| 301 | microcontroller |
| 302 | analog/input header |
| 302A | analog input pins |
| 303 | power header |
| 303A | voltage in pin |
| 303B | ground pins |
| 303C | 5 V pin |
| 303D | 3.3 V pin |
| 303E | reset pin |
| 304A | serial receiving pin |
| 304B | serial transmitting pin |
| 304C | digital input/output pins |
| 304D | digital ground pin |
| 304E | analog reference pin |
| 305A | USB shell |
| 305B | USB core |
| 306 | power LED indicator |
| 307 | DC power jack |
| 308 | capacitor(s) |
| 400 | exemplary build for linear intake embodiment(s) |
| 401 | flange |
| 402 | main body |
| 403 | bearing |
| 404 | square tube |
| 500 | TAZ |
| 600 | top cap |
| 601 | ceiling |
| 602 | circumferential wall |
| 603 | outlets |
| 604 | mounting tabs |
| 700 | fan |
| 701 | impeller |
| 702 | fan housing |
| 703 | fan housing mounting apertures |
| 800 | lower fan plate |
| 900 | collection plate |
| 901 | collection plate attaching apertures |
| 902 | collection plate mounting apertures |
| 903 | collection plate fluid opening |
| 1000 | scroll shaped housing |
| 1001 | housing mounts |
| 1002 | fluid inlet |
| 1100 | grille |
| 1200 | big bottle with cutout |
| 1300 | cartridge |
| 1301 | indicator |
| 1302 | channels |
| 1400 | removable tube holder |
| 1500 | exemplary build for circular intake embodiment(s) |
| 1501 | flange |
| 1502 | cyclone mount plate |
| 1600 | dry cyclone |
| 1700 | circular intake |
| 1701 | fluid inlets |
| 1800 | big bottle with no cutout |
| 1900 | automated method for collection and analysis of collected materials |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

Deoxyribonucleic acid(s) ("DNA") are molecule(s) composed of two polynucleotide chains that coil around each other to form a double helix carrying genetic instructions for the development, functioning, growth and reproduction of viruses and all known organisms, including pathogens.

Ribonucleic acid ("RNA") is a polymeric molecule essential in various biological roles in coding, decoding, regulation and expression of genes. RNA and DNA are both nucleic acids. Like DNA, RNA is assembled as a chain of nucleotides, but unlike DNA, RNA is found in nature as a single strand folded onto itself, rather than a paired double strand.

Loop-mediated isothermal amplification ("LAMP") is a single-tube technique for the amplification of DNA and a low-cost alternative to detect specific nucleic acids.

Polymerase chain reaction ("PCR") is a method widely used to rapidly make millions to billions of copies of a specific DNA sample, allowing scientists to take a very small sample of DNA and amplify it to a large enough amount to study in detail. PCR is fundamental to much of genetic testing including analysis of ancient samples of DNA and identification of infectious agents. Using PCR, copies of very small amounts of DNA sequences are exponentially amplified in a series of cycles of temperature changes.

"Malachite green" is an organic compound that is used as a dyestuff.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

A processing unit, also called a processor, as used herein, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, hand-held devices, laptops, user displays, smart devices (TV, speaker, watch, etc.), and other computing devices.

A "database", as used herein, is a structured set of data typically held in a computer. A database, as used herein, need not reside in a single physical or electronic location. Databases may reside on a local storage device, in an external hard drive, on a database server connected to a network, on a cloud-based storage system, in a distributed ledger (such as those commonly used with blockchain technology), or the like.

"Cloud computing", as used herein, is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. At the heart of cloud computing is an infrastructure comprising a network of interconnected nodes.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A collection device comprising:
   a housing with a fluid inlet, said housing suspended in air by a support structure mounted to the ground and configured to exert a centripetal force on air entering the fluid inlet so as to translate linear motion of said air to rotational motion;
   a fan that when operated causes the air to enter the fluid inlet;
   a power source for powering the fan;
   a collection zone for capturing particles contained within the air that enters the fluid inlet, wherein a fluid entrance of said collection zone is oriented perpendicularly to a direction the air enters the fluid inlet and positioned below the fluid inlet;

an outlet allowing for air to exit the capture device after the particles have been captured in the collection zone;

a support piece extending from the housing and operatively attached to the support structure; and a weathervane attached to the support piece opposite the housing;

wherein the support piece is positioned on top of a plurality of ball bearings and is rotatable atop the plurality of ball bearings, wherein the plurality of ball bearings act as a center of rotation for the weathervane and the housing to rotate around, wherein neither of the housing nor the weathervane are positioned above the center of rotation so as to enhance a sensitivity of the collection device to a crossflow of air;

wherein the fluid inlet is configured to receive a flow of air substantially parallel to the ground, wherein the housing comprises a scroll shape and it is because of the scroll shape that the flow of air is translated from a linear motion to a rotational motion when the flow of air enters the collection device.

2. The collection device of claim 1 wherein the particles are sized between one micron and one millimeter.

3. The collection device of claim 1 wherein the housing comprises a dry cyclone that can classify, separate, or sort particles in a fluid suspension based on a ratio of centripetal force to fluid resistance, inertial force and gravity.

4. The collection device of claim 1 wherein the power source is a rechargeable battery electrically connected to an array of solar panels or a wind turbine.

5. The collection device of claim 1 further comprising a controller to regulate power of the power source.

6. The collection device of claim 1 wherein the collection zone is selected from the group consisting of:
   a. a tube;
   b. a well;
   c. a cartridge; and
   d. a cassette.

7. The collection device of claim 1 further comprising a sensor selected from the group consisting of:
   a. an anemometer;
   b. a hygrometer;
   c. a temperature sensor;
   d. a relative humidity sensor;
   e. a photodetector;
   f. a flow sensor;
   g. an air pollution sensor;
   h. a smoke detector;
   i. a soil moisture sensor;
   j. a pressure sensor;
   k. a position sensor;
   l. a microphone; and
   m. a video camera.

8. The collection device claim 1 further comprising a wireless transceiver capable of transmitting and receiving digital communications to and from a network.

9. The collection device claim 1 wherein said support structure comprises:
   a base configured to sit on the ground; and
   an elongated member to elevate the fluid inlet to be just above a canopy of a crop being planted in an adjacent field.

10. The collection device of claim 1 further comprising (i) a filter for the fluid inlet; or (ii) a grille that acts as a grating forming a barrier or a screen for the air entering the fluid inlet.

* * * * *